United States Patent
Jin et al.

(10) Patent No.: US 12,273,831 B2
(45) Date of Patent: Apr. 8, 2025

(54) SYNCHRONIZATION SIGNAL/BROADCAST SIGNAL BLOCK BROADCAST METHOD AND APPARATUS

(71) Applicant: HUAWEI TECHNOLOGIES CO., LTD., Shenzhen (CN)

(72) Inventors: Yinghao Jin, Boulogne Billancourt (FR); Jinping Hao, Shanghai (CN); Wei Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 17/826,973

(22) Filed: May 27, 2022

(65) Prior Publication Data
US 2022/0303926 A1 Sep. 22, 2022

Related U.S. Application Data

(63) Continuation of application No. PCT/CN2019/122286, filed on Nov. 30, 2019.

(51) Int. Cl.
*H04W 56/00* (2009.01)
*H04B 17/318* (2015.01)
*H04W 24/10* (2009.01)

(52) U.S. Cl.
CPC ........ *H04W 56/001* (2013.01); *H04B 17/318* (2015.01); *H04W 24/10* (2013.01)

(58) Field of Classification Search
CPC .............. H04W 56/001; H04W 24/10; H04W 52/0216; H04W 52/0258; H04W 56/0015;
(Continued)

(56) References Cited

U.S. PATENT DOCUMENTS 10,917,778 B2 * 2/2021 Wang ............... H04W 28/26
2014/0050206 A1 * 2/2014 Seo ................. H04J 11/0069
370/336
(Continued)

FOREIGN PATENT DOCUMENTS

CN 105684531 A 6/2016
CN 108769998 A 11/2018
(Continued)

OTHER PUBLICATIONS

Nokia, Nokia Shanghai Bell, Signalling of PCI for each SSB over Xn. 3GPP TSG-RAN WG2 Meeting #104, Spokane, USA, Nov. 12-16, 2018, R2-1817050, 4 pages.
(Continued)

*Primary Examiner* — Dady Chery
(74) *Attorney, Agent, or Firm* — HAUPTMAN HAM, LLP

(57) ABSTRACT

A synchronization signal/broadcast signal block broadcast method and an apparatus are disclosed. The method includes: A first access network device RAN 1 determines to request a second access network device RAN 2 to perform resource allocation for a terminal; and the RAN 1 sends, to the RAN 2, a first message used to indicate the RAN 2 to broadcast a synchronization signal/physical broadcast channel block SSB. Accordingly, the RAN 2 starts to broadcast the SSB. The first message further includes a broadcast periodicity for the SSB. The broadcast periodicity is further sent by the RAN 1 to the terminal. The RAN 2 stops, based on a specific situation, broadcasting the SSB.

20 Claims, 11 Drawing Sheets

(58) Field of Classification Search
CPC ..... H04W 92/20; H04W 48/10; H04W 76/01; H04B 17/318
See application file for complete search history.

(56) References Cited

U.S. PATENT DOCUMENTS

| | | | |
|---|---|---|---|
| 2018/0042002 A1* | 2/2018 | Yang | H04W 88/06 |
| 2021/0368527 A1* | 11/2021 | Lin | H04W 72/1273 |
| 2022/0377683 A1* | 11/2022 | Myung | H04W 74/0816 |

FOREIGN PATENT DOCUMENTS

| | | | |
|---|---|---|---|
| CN | 110035443 A | 7/2019 | |
| CN | 111586842 A | 8/2020 | |
| WO | 2019016987 A1 | 1/2019 | |
| WO | 2019074430 A1 | 4/2019 | |

OTHER PUBLICATIONS

International Search Report issued in corresponding International Application No. PCT/CN2019/122286, dated Aug. 18, 2020, pp. 1-11.
Intel Corporation: "Applicability of dormant SCell for NR", 3GPP Draft; R2-1906421, May 3, 2019, XP051710736, total 5 pages.
Extended European Search Report issued in corresponding European Application No. 19954327.3, dated Sep. 29, 2022, pp. 1-8.
Chinese Office Action issued in corresponding Chinese Application No. 201980102016.4, dated Jul. 9, 2024, pp. 1-7.
Chinese Office Action issued in corresponding Chinese Application No. 201980102016.4, dated Dec. 31, 2024, pp. 1-7.

* cited by examiner

SYNCHRONIZATION SIGNAL/BROADCAST SIGNAL BLOCK BROADCAST METHOD AND APPARATUS

CROSS-REFERENCE TO RELATED APPLICATIONS

This application is a continuation of International Application No. PCT/CN2019/122286, filed on Nov. 30, 2019, which is incorporated herein by reference in its entirety.

BACKGROUND

High energy consumption is a pain point in network systems.

SUMMARY

Embodiments described herein provide a synchronization signal/broadcast signal block broadcast method and an apparatus, to reduce system energy consumption.

According to a first aspect, a synchronization signal/physical broadcast channel block SSB broadcast method is provided. The method is implemented based on the following steps. A first access network device determines to request a second access network device to perform resource allocation for a terminal; and the first access network device sends a first message to the second access network device, where the first message indicates an SSB for the second access network device to broadcast. In response to determining to request the second access network device to perform resource allocation for the terminal, the first access network device sends, to the second access network device, the message used to indicate to broadcast the SSB. The first access network device determines to request the second access network device to perform resource allocation for the terminal, and the first access network device indicates the second access network device to broadcast the SSB, so that the second access network device starts to broadcast the SSB in response to receiving the indication. This prevents the second access network device from keeping broadcasting the SSB, to reduce energy consumption of the second access network device, and therefore, energy consumption of an entire system is reduced.

In at least one embodiment, the first message includes a broadcast periodicity, and the broadcast periodicity is a periodicity for the second access network device to broadcast the SSB. The first access network device sends the broadcast periodicity to the second access network device, so that the second access network device broadcasts the SSB based on the broadcast periodicity. In at least one embodiment, the first access network device sends a message including a broadcast periodicity to the second access network device, where the broadcast periodicity is a periodicity for the second access network device to broadcast the SSB. The message is a message other than the first message. The first access network device sends the message including the broadcast periodicity to the second access network device, so that the second access network device broadcasts the SSB based on the broadcast periodicity. The broadcast periodicity is set, so that the system is more flexible and consumes less energy. For example, in response to the broadcast periodicity being set to be longer than a default periodicity, the energy consumption is further reduced. In response to the broadcast periodicity being set to be shorter than the default periodicity, the terminal accesses the second access network device more quickly.

In at least one embodiment, the first access network device sends the broadcast periodicity to the terminal. The broadcast periodicity is the periodicity for the second access network device to broadcast the SSB. In this way, the terminal obtains the broadcast periodicity for the second access network device to broadcast the SSB, so that the terminal receives the SSB from the second access network device based on the broadcast periodicity. In this way, the terminal is prevented from selecting another network for access because no SSB is found in response to the terminal searching for the SSB based on another periodicity. This helps ensure that the terminal normally accesses the second access network device.

In at least one embodiment, the first access network device sends a second message to the second access network device, where the second message indicates to the second access network device to stop broadcasting the SSB. The indication of stopping broadcasting the SSB further reduces energy consumption overheads of the second access network device, and further reduce the system energy consumption.

In at least one embodiment, before the first access network device sends the second message to the second access network device, the first access network device receives a third message from the second access network device, where the third message indicates a state in which the terminal accesses the second access network device. Optionally, the state in which the terminal accesses the second access network device is a state in which the terminal, for which the resource allocation is requested, accesses the second access network device. In this way, the third message enables the first access network device to learn of the state in which the terminal accesses the second access network device, so that the first access network device determines, based on the state that is indicated by the third message and in which the terminal accesses the second access network device, whether to indicate the second access network device to stop broadcasting an SBB. Further, the second access network device is indicated, in a timely manner, to stop broadcasting the SBB, so that the energy consumption of the second access network device is reduced.

In at least one embodiment, the state in which the terminal accesses the second access network device includes: (1) terminals have accessed the second access network device; and (2) a part of terminals has accessed the second access network device. In the case (2), the third message carries an identifier of the terminal that accesses the second access network device, and/or the third message carries an identifier of a terminal that does not access the second access network device.

In at least one embodiment, the first access network device receives, from the second access network device, a message used to indicate that the second access network device determines to stop broadcasting the SBB. Stopping broadcasting the SBB reduces the energy consumption overheads of the second access network device. In this way, the first access network device determines, based on the message, that the second access network device has determined to stop broadcasting the SBB. In addition, in response to the second access network device performing resource allocation for the terminal subsequently, the first access network device sends a message that has a function the same as/similar to that of the first message to the second access network device again.

In at least one embodiment, the first access network device sends a fourth message to the terminal, where the fourth message includes a threshold, which is denoted as a first threshold; or the fourth message indicates a reporting condition of the terminal, where the reporting condition includes that the terminal triggers reporting in response to a measured strength of a downlink signal of the first access network device being greater than or equal to a first threshold. The first access network device indicates, by sending the fourth message to the terminal, the terminal to perform reporting, so that the first access network device determines, based on reported content of the terminal, that the first access network device requests the second access network device to perform resource allocation for the terminal. Therefore, the first access network device indicates the second access network device to broadcast the SBB. Further, the first access network device indicates the second access network device to broadcast the SBB, so that in response to receiving the indication, the second access network device starts to broadcast the SBB. Compared with a solution in which the second access network device keeps broadcasting the SBB, this solution reduces the energy consumption of the second access network device.

In at least one embodiment, the first access network device receives a fifth message from the terminal, where the fifth message includes the strength that is of the downlink signal of the first access network device and that is measured by the terminal; or the fifth message indicates the strength of the downlink signal of the first access network device and that the strength is greater than or equal to the first threshold. In response to the method being applied to a dual-connectivity architecture or a multi-connectivity architecture, the first access network device determines, by using the fifth message reported by the terminal, whether the second access network device is suitable to perform resource allocation for the terminal, so that the first access network device determines to indicate the second access network device to broadcast the SSB. Further, the first access network device indicates the second access network device to broadcast the SSB, so that in response to receiving the indication, the second access network device starts to broadcast the SSB. Compared with the solution in which the second access network device keeps broadcasting the SSB, this solution reduces the energy consumption of the second access network device.

In at least one embodiment, the first access network device sends a sixth message to the terminal, where the sixth message includes a threshold, which is denoted as a second threshold; or the sixth message indicates a reporting condition of the terminal, where for example, the reporting condition includes that the terminal triggers reporting in response to a measured strength of a downlink signal of the second access network device being greater than or equal to a second threshold. The first access network device indicates, by sending the sixth message to the terminal, the terminal to perform reporting, so that the terminal triggers reporting based on the strength of the downlink signal of the second access network device. In this way, the first access network device obtains more accurate information from the terminal, to determine whether the first access network device requests the second access network device to perform resource allocation for the terminal. In response to determining that the first access network device requests the second access network device to perform resource allocation for the terminal, the first access network device indicates the second access network device to broadcast the SSB. Further, the first access network device indicates the second access network device to broadcast the SSB, so that in response to receiving the indication, the second access network device starts to broadcast the SSB. Compared with the solution in which the second access network device keeps broadcasting the SSB, this solution reduces the energy consumption of the second access network device.

In at least one embodiment, the first access network device receives a seventh message from the terminal, where the seventh message includes the strength that is of the downlink signal of the second access network device and that is measured by the terminal; or the seventh message that the strength is of the downlink signal of the second access network device and that the strength is greater than or equal to the second threshold. The first access network device more accurately determines, by using the seventh message reported by the terminal, whether the second access network device is suitable to perform resource allocation for the terminal. In response to determining that the second access network device is suitable to perform resource allocation for the terminal, the first access network device indicates the second access network device to broadcast the SSB. Further, the first access network device indicates the second access network device to broadcast the SSB, so that in response to receiving the indication, the second access network device starts to broadcast the SSB. Compared with the solution in which the second access network device keeps broadcasting the SSB, this solution reduces the energy consumption of the second access network device.

In at least one embodiment, the first access network device receives an eighth message from a third network device, where the eighth message indicates that a secondary access network device of the terminal is to be handed over from the third network device to the second network device; or indicates that the second network device is to be added as a secondary access network device of the terminal. The third access network device is the secondary access network device. In a handover scenario, the first access network device receives a handover indication message from the third access network device, to determine an occasion for indicating the second access network device to start to broadcast the SSB. Further, the first access network device indicates the second access network device to broadcast the SSB, so that in response to receiving the indication, the second access network device starts to broadcast the SSB. Compared with the solution in which the second access network device keeps broadcasting the SSB, this solution reduces the energy consumption of the second access network device.

In at least one embodiment, the second access network device is a gNB.

In at least one embodiment, the first message indicates, at a cell granularity, the second access network device to broadcast the SBB. For example, the first message carries one or more identifiers of one or more cells, and indicates the one or more cells of the second access network device to broadcast one or more SBBs.

In at least one embodiment, the second message indicates, at the cell granularity, the second access network device to stop broadcasting the SBB. For example, the first message carries one or more identifiers of one or more cells, and indicates the one or more cells of the second access network device to stop broadcasting one or more SBBs.

According to a second aspect, an SBB broadcast method is provided. The method is implemented by using the following steps. A second access network device receives a first message from a first access network device; and the second access network device broadcasts an SBB based on the first message. In response to receiving the first message, the second access network device starts to broadcast the SBB, so that the second access network device is prevented from keeping broadcasting the SBB. This reduces energy consumption of the second access network device, thereby reducing energy consumption of an entire system.

In at least one embodiment, the first message includes a broadcast periodicity, and the broadcast periodicity is a periodicity for the second access network device to broadcast an SSB. The second access network device receives the broadcast periodicity from the first access network device, so that the second access network device broadcasts the SSB based on the broadcast periodicity. In at least one embodiment, the second access network device receives, from the first access network device, a message including a broadcast periodicity, where the broadcast periodicity is a periodicity for the second access network device to broadcast the SSB. The second access network device receives, from the first access network device, the message including the broadcast periodicity, so that the second access network device broadcasts the SSB based on the broadcast periodicity. In response to the broadcast periodicity being longer than a default broadcast periodicity, the periodicity for the second access network device to broadcast the SSB is prolonged, so that the energy consumption is further reduced. In response to the broadcast periodicity being longer than the default broadcast periodicity, the terminal accesses the second access network device more quickly.

In at least one embodiment, the second access network device sends a message to the first access network device, where the message includes a broadcast periodicity, and the broadcast periodicity is a periodicity for the second access network device to broadcast the SSB. The second access network device indicates, to the first access network device, the broadcast periodicity for the second access network device to broadcast the SSB, and the first access network device sends the broadcast periodicity to the terminal, so that the terminal obtains the broadcast periodicity of the second access network device, and receives the SSB based on the broadcast periodicity of the second access network device. The terminal is prevented from selecting another network for access because no SSB is found in response to the terminal searching for the SSB based on another periodicity. This helps ensure that the terminal normally accesses the second access network device.

In at least one embodiment, the second access network device stops broadcasting the SBB.

In at least one embodiment, the second access network device receives a second message from the first access network device, and the second access network device stops, based on the second message, broadcasting the SBB. The indication of stopping broadcasting the SBB further reduces energy consumption overheads of the second access network device.

In at least one embodiment, before sending the second message to the second access network device, the second access network device sends a third message to the first access network device, where the third message indicates a state in which the terminal accesses the second access network device. Optionally, the state in which the terminal accesses the second access network device is a state in which the terminal, for which the resource allocation is requested, accesses the second access network device. In this way, the third message enables the first access network device to learn of the state in which the terminal accesses the second access network device, so that the first access network device determines, based on the state that is indicated by the third message and in which the terminal accesses the second access network device, whether to indicate the second access network device to stop broadcasting the SBB. Further, the second access network device is indicated, in a timely manner, to stop broadcasting the SBB, so that the energy consumption of the second access network device is further reduced.

In at least one embodiment, the state in which the terminal accesses the second access network device includes: (1) terminals have accessed the second access network device; and (2) a part of terminals has accessed the second access network device. In case (2), the third message carries an identifier of the terminal that accesses the second access network device, and/or the third message carries an identifier of a terminal that does not access the second access network device.

In at least one embodiment, the second access network device determines, based on a status of the second access network device, to stop broadcasting the SBB. The status of the second access network device is the state in which the terminal accesses the second access network device. The second access network device stops, in a timely manner, broadcasting the SBB, so that energy consumed by the second access network device to broadcast the SBB is reduced.

In at least one embodiment, in response to the second access network device determining to stop broadcasting the SBB, the second access network device further notifies the first access network device that the second access network device determines to stop broadcasting the SBB.

In at least one embodiment, the second access network device receives an uplink measurement configuration from a third access network device. The uplink measurement configuration includes information about a resource of an uplink measurement signal, and the uplink measurement configuration indicates to the second access network device to receive the uplink measurement signal from the terminal. The second access network device sends an uplink measurement report to the third access network device, where the uplink measurement report includes that a strength of an uplink reference signal received from the terminal is greater than or equal to a second threshold; or a strength value of an uplink measurement signal received from the terminal. In this way, the third access network device determines a handover event based on the uplink measurement report, to be specific, determine to hand over a secondary access network device of the terminal from the third access network device to the second access network device. Further, the third access network device sends a request message to the first access network device to request the first access network device to initiate handover, to be specific, hand over the secondary access network device of the terminal from the third access network device to the second access network device, so that the terminal obtains a better service of the secondary access network device.

In at least one embodiment, the first message indicates, at a cell granularity, the second access network device to broadcast the SBB. For example, the first message carries one or more identifiers of one or more cells, and indicates the one or more cells of the second access network device to broadcast one or more SBBs.

In at least one embodiment, the second message indicates, at the cell granularity, the second access network device to stop broadcasting the SBB. For example, the first message carries one or more identifiers of one or more cells, and indicates the one or more cells of the second access network device to stop broadcasting one or more SBBs.

According to a third aspect, a handover method for a secondary access network device is provided. The method is performed by a third access network device, and the method is implemented by using the following steps. The third access network device receives a message from a second access network device, where the message is an uplink measurement report, and the message includes information indicating that a strength of an uplink measurement signal received by the second access network device from a terminal is greater than a second threshold; and the third access network device sends a request message to a first access network device, where the request message indicates that a secondary access network device of the terminal is to be handed over from the third access network device to the second access network device. In this way, in response to receiving the request message, the first access network device determines that the second access network device is to perform resource allocation for the terminal, to be specific, further determines an occasion for indicating the second access network device to broadcast an SBB. The second access network device is prevented from keeping broadcasting the SBB, so that energy consumption of the second access network device is reduced, thereby reducing energy consumption of an entire system.

In at least one embodiment, the third access network device sends an uplink measurement configuration to the second access network device, where the uplink measurement configuration includes information about a resource of the uplink measurement signal, and the uplink measurement configuration indicates to the second access network device to receive the uplink measurement signal from the terminal. In this way, after receiving the uplink measurement configuration, the second access network device receives, on the resource indicated by the uplink measurement configuration, the uplink measurement signal sent by the terminal, to determine whether the terminal moves to a service range of the second access network device.

In at least one embodiment, the uplink measurement configuration includes the second threshold or event trigger information. The second threshold or the event trigger information indicates to the second access network device to send the uplink measurement report to the third access network device after a specific condition is satisfied.

In at least one embodiment, the uplink measurement configuration includes an identifier of the terminal.

In at least one embodiment, the third access network device sends the uplink measurement configuration to the terminal. The third access network device sends the uplink measurement configuration to the terminal, and the terminal sends the uplink measurement signal on the resource indicated by the uplink measurement configuration, so that the second access network device detects, on the resource indicated by the uplink measurement configuration, the uplink measurement signal sent by the terminal.

According to a fourth aspect, an SBB broadcast method is provided. The method includes the following steps. A terminal receives a message from a first access network device, where the message is denoted as a fourth message, and the fourth message includes a threshold, which is denoted as a first threshold; or the fourth message indicates a reporting condition of the terminal, where the reporting condition includes that the terminal triggers reporting in response to a measured strength of a downlink signal of the first access network device being greater than or equal to a first threshold. The terminal sends a fifth message to the first access network device, where the fifth message includes the strength that is of the downlink signal of the first access network device and that is measured by the terminal; or the fifth message indicates the strength is of the downlink signal of the first access network device and that the strength is greater than or equal to the first threshold. The fourth message is received, so that the fifth message is reported to the first access network device in response to the reporting condition being satisfied, so that the first access network device determines, by using the fifth message reported by the terminal, that a second access network device is suitable for serving as the secondary access network device of the terminal. Further, the first access network device indicates the second access network device to broadcast an SBB, so that the second access network device broadcasts an SSB based on the indication of the first access network device, and energy is saved in response to no SBB being broadcast.

Optionally, the strength of the downlink signal is a power or a signal-to-noise ratio of the downlink signal.

In at least one embodiment, the fourth message is a broadcast message, and the fifth message is an RRC message. Alternatively, in response to the fourth message including measurement configuration information, the fifth message is a measurement report.

In at least one embodiment, in response to the strength that is of the downlink signal of the first access network device and that is measured by the terminal being greater than or equal to the first threshold, the terminal sends the fifth information to the first access network device.

In at least one embodiment, the terminal receives a broadcast periodicity from the first access network device, where the broadcast periodicity is a periodicity for the second access network device to send the SBB to the terminal. The first access network device sends the broadcast periodicity to the terminal, so that the terminal obtains the broadcast periodicity of the second access network device, and receives the SBB based on the broadcast periodicity of the second access network device. The terminal is prevented from selecting another network for access because no SBB is found in response to the terminal searching for the SBB based on a short periodicity. This helps ensure that the terminal normally accesses the second access network device.

According to a fifth aspect, an SBB broadcast method is provided. The method is implemented by using the following steps. A terminal receives, from a first access network device, a message including a broadcast periodicity, where the broadcast periodicity is a periodicity for a second access network device to broadcast an SBB; and the terminal receives the SBB from the second access network device based on the broadcast periodicity. The terminal receives, from the first access network device, the periodicity for the second access network device to broadcast the SBB, so that the terminal detects, based on the periodicity, the SBB broadcast by the second access network device. The terminal is prevented from selecting another network for access because no SBB is found in response to the terminal searching for the SBB based on another periodicity. This helps ensure that the terminal normally accesses the second access network device.

In at least one embodiment, the broadcast periodicity is a periodicity for one or more cells of the second access network device to broadcast one or more SBBs, and the terminal receives the one or more SBBs from the one or more cells of the second access network device based on the broadcast periodicity.

According to a sixth aspect, an SBB broadcast method is provided. The method is implemented by using the following steps. A first access network device determines to request a second access network device to perform resource allocation for a terminal, and the first access network device sends a first message to the second access network device, where the first message carries a second broadcast periodicity for the second access network device to broadcast a common control signal, the second broadcast periodicity is shorter than a first broadcast periodicity, and the first broadcast periodicity is a periodicity used by the second access network device to broadcast a common control signal before the first access network device sends the first message to the second access network device.

According to still another aspect, an SBB broadcast method is provided. The method is implemented by using the following steps. A second access network device broadcasts an SBB based on a first broadcast periodicity. A first access network device sends a first message to the second access network device, where the first message carries a second broadcast periodicity for the second access network device to broadcast an SBB, and the second access network device receives the first message sent by the first access network device; or the second access network device determines a second broadcast periodicity for broadcasting an SBB, and sends a second message to the first access network device, where the second message carries the second broadcast periodicity determined by the second access network device. The first access network device receives the second message sent by the second access network device. The second broadcast periodicity is longer than or shorter than the first broadcast periodicity. In response to the second broadcast periodicity being longer than the first broadcast periodicity, energy consumption is further reduced by prolonging the periodicity for the second access network device to broadcast the SBB. In response to the second broadcast periodicity being shorter than the first broadcast periodicity, and in response to determining that the second access network device performs resource allocation for a terminal, the first access network device sends the first message to the second access network device, and indicates, by using the first message, the second access network device to adjust the first broadcast periodicity to the second broadcast periodicity, where the second broadcast periodicity is shorter than the first broadcast periodicity, so that it is considered that the broadcast periodicity of the second access network device is changed from a long periodicity to a short periodicity. Therefore, the terminal accesses the second access network device more quickly. Compared with disabling broadcasting the SBB, broadcasting the SBB based on the longer first broadcast periodicity by the second access network device does not involve frequent starting and stopping broadcasting the SBB, so that signaling overheads caused by starting and stopping broadcasting the SBB are reduced.

In at least one embodiment, the first access network device sends the second message to the terminal, and the terminal receives the second message sent by the first access network device. The message carries information about the second broadcast periodicity for the second access network device to broadcast the SBB. The first access network device sends, to the terminal, the second broadcast periodicity for the second access network device to broadcast the SBB, so that the terminal receives the SBB based on the broadcast periodicity of the second access network device. The terminal is prevented from selecting another network for access because no SBB is found in response to searching for the SBB based on a periodicity shorter than the broadcast periodicity of the second access network device. This helps the terminal normally access the second access network device.

In at least one embodiment, the first message carries one or more identifiers of one or more cells, and indicates a second broadcast periodicity for the one or more cells of the second access network device to broadcast one or more SBBs.

In at least one embodiment, the first message carries one or more identifiers of one or more cells, and indicates a second broadcast periodicity for the one or more cells of the second access network device to broadcast one or more SBBs.

According to a seventh aspect, a communication apparatus is provided. The communication apparatus is an access network device, for example, a first access network device, an apparatus (for example, a chip, a chip system, or a circuit) in the first access network device, or an apparatus that is used in matching with the first access network device. In at least one embodiment, the communication apparatus includes modules that one-to-one correspond to the methods/operations/steps/actions performed by the first access network device described in the first aspect or the sixth aspect. The module is implemented by a hardware circuit, software, or a combination of a hardware circuit and software. In at least one embodiment, the communication apparatus includes a processing module and a communication module. The processing module is configured to invoke the communication module to perform a receiving function and/or a sending function. For example, the processing module is configured to determine to request a second access network device to perform resource allocation for a terminal; and the communication module is configured to send a first message to the second access network device, where the first message indicates an SSB for the second access network device to broadcast.

According to an eighth aspect, a communication apparatus is provided. The communication apparatus is an access network device, for example, a second access network device, an apparatus (for example, a chip, a chip system, or a circuit) in the second access network device, or an apparatus that is used in matching with the second access network device. In at least one embodiment, the communication apparatus includes modules that one-to-one correspond to the methods/operations/steps/actions performed by the second access network device described in the second aspect or the sixth aspect. The module is implemented by a hardware circuit, software, or a combination of a hardware circuit and software. In at least one embodiment, the communication apparatus includes a processing module and a communication module. The processing module is configured to invoke the communication module to perform a receiving function and/or a sending function. For example, the communication module is configured to receive a first message from a first access network device; and the processing module is configured to invoke, based on the first message, the communication module to broadcast an SBB.

According to a ninth aspect, a communication apparatus is provided. The communication apparatus is an access network device, for example, a third access network device, an apparatus (for example, a chip, a chip system, or a circuit) in the third access network device, or an apparatus that is used in matching with the second access network device. In at least one embodiment, the communication apparatus includes modules that one-to-one correspond to the methods/operations/steps/actions described in the third aspect. The module is implemented by a hardware circuit, software, or a combination of a hardware circuit and software. In at least one embodiment, the communication apparatus includes a processing module and a communication module. The processing module is configured to invoke the communication module to perform a receiving function and/or a sending function. For example, the communication module is configured to receive an uplink measurement report from a second access network device, where the uplink measurement report includes information indicating that a power of an uplink measurement signal received by the second access network device from a terminal is greater than a specified threshold; and the communication module is further configured to send a request message to a first access network device, where the request message indicates that the terminal is to be handed over from the third access network device to the second access network device.

According to a tenth aspect, a communication apparatus is provided. The communication apparatus is a terminal, an apparatus (for example, a chip, a chip system, or a circuit) in the terminal, or an apparatus that is used in matching with the terminal. In at least one embodiment, the communication apparatus includes modules that one-to-one correspond to the methods/operations/steps/actions described in the fourth aspect or the fifth aspect. The module is implemented by a hardware circuit, software, or a combination of a hardware circuit and software. In at least one embodiment, the communication apparatus includes a processing module and a communication module. The processing module is configured to invoke the communication module to perform a receiving function and/or a sending function. For example, the communication module is configured to receive a broadcast message from a first access network device, where the broadcast message includes trigger event information, and the trigger event information indicates a reporting condition of the terminal; and the communication module is further configured to send a radio resource control RRC message to the first access network device, where the RRC message includes indication information, and the indication information indicates that the terminal satisfies the reporting condition. For example, the communication module is configured to: receive, from the first access network device, information about a broadcast periodicity, where the broadcast periodicity is a periodicity for a second access network device to broadcast an SBB; and receive the SBB from the second access network device based on the broadcast periodicity.

According to an eleventh aspect, an embodiment provides a communication apparatus. For example, the communication apparatus is a first access network device, and the communication apparatus includes a communication interface and a processor. The communication interface is used by the apparatus to communicate with another device, for example, to send and receive data or a signal. For example, the communication interface is a transceiver, a circuit, a bus, a module, or a communication interface of another type, and the another device is a second access network device or a terminal. The processor is configured to invoke a group of programs, instructions, or data to perform the method described in the first aspect. The apparatus further includes a memory, configured to store the programs, the instructions, or the data invoked by the processor. The memory is coupled to the processor. In response to executing the instructions or the data stored in the memory, the processor implements the method described in the first aspect.

According to a twelfth aspect, an embodiment provides a communication apparatus. For example, the communication apparatus is a second access network device, and the communication apparatus includes a communication interface and a processor. The communication interface is used by the apparatus to communicate with another device, for example, to send and receive data or a signal. For example, the communication interface is a transceiver, a circuit, a bus, a module, or a communication interface of another type, and the another device is a first access network device, a third access network device, or a terminal. The processor is configured to invoke a group of programs, instructions, or data to perform the method described in the second aspect. The apparatus further includes a memory, configured to store the programs, the instructions, or the data invoked by the processor. The memory is coupled to the processor. In response to executing the instructions or the data stored in the memory, the processor implements the method described in the second aspect.

According to a thirteenth aspect, an embodiment provides a communication apparatus. For example, the communication apparatus is a third access network device, and the communication apparatus includes a communication interface and a processor. The communication interface is used by the apparatus to communicate with another device, for example, to send and receive data or a signal. For example, the communication interface is a transceiver, a circuit, a bus, a module, or a communication interface of another type, and the another device is a first access network device, a second access network device, or a terminal. The processor is configured to invoke a group of programs, instructions, or data, to perform the method described in the third aspect. The apparatus further includes a memory, configured to store the programs, the instructions, or the data invoked by the processor. The memory is coupled to the processor. In response to executing the instructions or the data stored in the memory, the processor implements the method described in the third aspect.

According to a fourteenth aspect, an embodiment provides a communication apparatus. The communication apparatus includes a communication interface and a processor, and the communication interface is used by the apparatus to communicate with another device, for example, to send and receive data or a signal. For example, the communication interface is a transceiver, a circuit, a bus, a module, or a communication interface of another type, and the another device is a first access network device. The processor is configured to invoke a group of programs, instructions, or data, to perform the method described in the fourth aspect or the fifth aspect. The apparatus further includes a memory, configured to store the programs, the instructions, or the data invoked by the processor. The memory is coupled to the processor. In response to executing the instructions or the data stored in the memory, the processor implements the method described in the fourth aspect.

According to a fifteenth aspect, an embodiment further provides a computer-readable storage medium. The computer-readable storage medium stores computer-readable instructions. In response to the computer-readable instructions being run on a computer, the computer is enabled to perform the method according to any one of the aspects or at least one embodiment of the aspects.

According to a sixteenth aspect, an embodiment provides a chip system. The chip system includes a processor, and further includes a memory, to implement the method in any one of the first aspect or at least one embodiment of the first aspect, or to implement the method performed by the first access network device in any one of the sixth aspect or at least one embodiment of the sixth aspect. The chip system includes a chip, or include a chip and another discrete device.

According to a seventeenth aspect, an embodiment provides a chip system. The chip system includes a processor, and further includes a memory, to implement the method in any one of the second aspect or at least one embodiment of the second aspect, or to implement the method performed by the second access network device in any one of the sixth aspect or at least one embodiment of the sixth aspect. The chip system includes a chip, or include a chip and another discrete device.

According to an eighteenth aspect, an embodiment provides a chip system. The chip system includes a processor, and further includes a memory, to implement the method in any one of the third aspect or at least one embodiment of the third aspect. The chip system includes a chip, or include a chip and another discrete device.

According to a nineteenth aspect, an embodiment provides a chip system. The chip system includes a processor, and further includes a memory, to implement the method in any one of the fourth aspect, the fifth aspect, at least one embodiment of the fourth aspect, or at least one embodiment of the fifth aspect. The chip system includes a chip, or include a chip and another discrete device.

According to a twentieth aspect, an embodiment provides a system. The system includes a first access network device and a second access network device, the first access network device is configured to perform the method in any one of the first aspect or at least one embodiment, and the second access network device is configured to perform the method in any one of the second aspect or at least one embodiment.

In at least one embodiment, the system further includes a third access network device, and the third access network device is configured to perform the method in any one of the third aspect or at least one embodiment.

In at least one embodiment, the system further includes a terminal, and the terminal is configured to perform the method in any one of the fourth aspect, the fifth aspect, at least one embodiment of the fourth aspect, or at least one embodiment of the fifth aspect.

According to a twenty-first aspect, an embodiment provides a system. The system includes a first access network device and a second access network device. The first access network device is configured to: determine to request the second access network device to perform resource allocation for a terminal; and send a first message to the second access network device, where the first message indicates an SSB for the second access network device to start to broadcast. The second access network device is configured to: receive the first message from the first access network device, and broadcast the SSB based on the first message.

DESCRIPTION OF EMBODIMENTS

Embodiments provide an SBB broadcast method and an apparatus. Mutual reference is made to implementations of the apparatus and the method, and repeated descriptions are not provided. In descriptions of embodiments, the term "and/or" describes an association relationship between associated objects and indicates that three relationships exist. For example, A and/or B indicates the following three cases: Only A exists, both A and B exist, and only B exists. The character "/" generally represents an "or" relationship between the associated objects. In the description herein, "at least one" means one or more, and "a plurality of" means two or more.

In addition, in the descriptions, the terms such as "first", "second", and "third" are merely used for distinguishing and description, but cannot be understood as an indication or implication of relative importance or an indication or implication of an order. The SBB broadcast method provided in embodiments is applied to a 5th generation 5G communication system, for example, a 5G new radio (new radio, NR) communication system, and is further applied to various future communication systems.

The following describes in detail embodiments with reference to the accompanying drawings.

Figure 1:
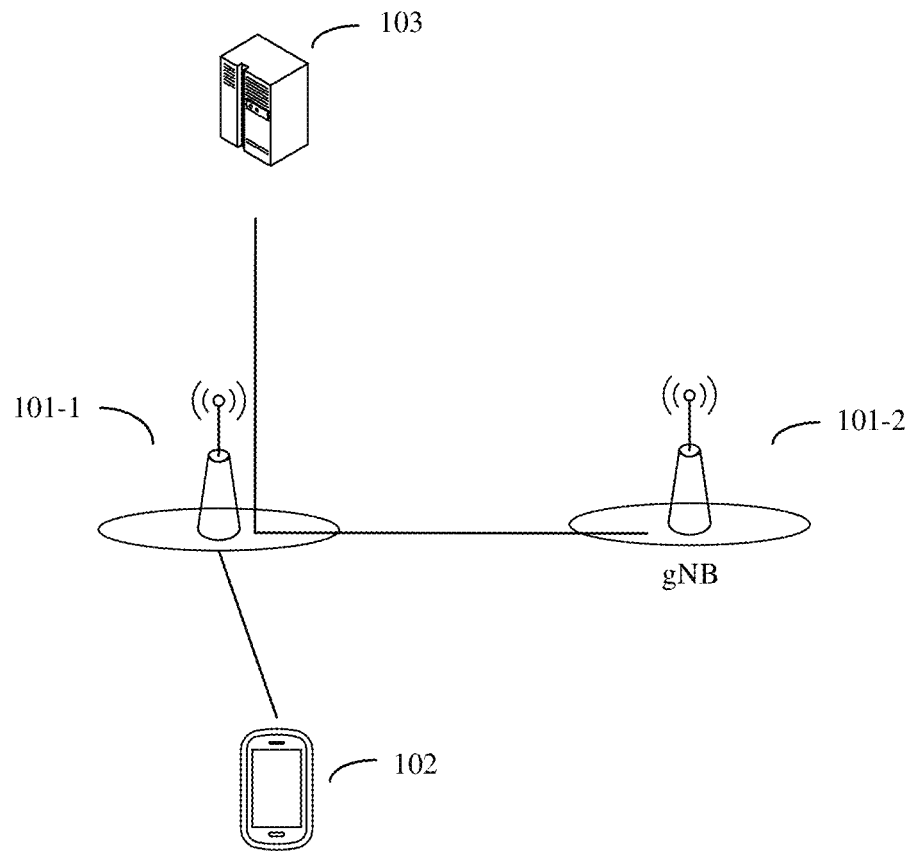
FIG. 1 is a schematic diagram of an architecture of a communication system according to at least one embodiment.

FIG. 1 shows a communication system to which the SBB broadcast method provided in embodiments is applicable. The communication system includes a first access network device 101-1 and a second access network device 101-2. The communication system further includes a terminal device 102 and a core network device 103. The access network device or the terminal device is hardware, is software obtained through functional division, or is a combination thereof. The first access network device 101-1 and the second access network device 101-2 is connected through an interface (for example, an Xn interface or an X2 interface). The first access network device 101-1 or the second access network device 101-2 sends downlink data to the terminal device 102, or receives uplink data sent by the terminal device 102.

The first access network device 101-1 and the second access network device 101-2 are nodes in a radio access network (radio access network, RAN), is also referred to as base stations, and is also referred to as RAN nodes (or devices). Some examples of access network devices includes a next generation NodeB (next generation NodeB, gNB), a next generation evolved NodeB (next generation evolved NodeB, Ng-eNB), a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a wireless fidelity (wireless fidelity, Wi-Fi) access point (access point, AP), an access network device in a 5G communication system, or an access network device in a future communication system.

An apparatus configured to implement a function of an access network device is an access network device, or is, for example, a chip system, that supports the access network device in implementing the function. The apparatus is mounted in the access network device. In the technical solutions provided in embodiments, an example in which the apparatus configured to implement the function of the access network device is the access network device is used to describe the technical solutions provided in at least one embodiment.

The terminal device 102 is also referred to as user equipment (user equipment, UE), a mobile station (mobile station, MS), a mobile terminal (mobile terminal, MT), or the like, and is a device that provides a voice or data connectivity for a user, or is an internet-of-things device. For example, the terminal device 102 includes a handheld device, a vehicle-mounted device, and the like that have a wireless connection function. The terminal device 102 is a mobile phone (mobile phone), a tablet computer, a notebook computer, a palmtop computer, a mobile internet device (mobile internet device, MID), a wearable device (for example, a smartwatch, a smart band, or a pedometer), a vehicle-mounted device (for example, a car, a bicycle, an electric vehicle, an airplane, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or an electricity meter), an intelligent robot, a workshop device, a wireless terminal in self driving (self driving), a wireless terminal in remote surgery (remote surgery), a wireless terminal in a smart grid (smart grid), a wireless terminal in transportation safety (transportation safety), a wireless terminal in a smart city (smart city), a wireless terminal in a smart home (smart home), a flight device (for example, an intelligent robot, a hot balloon, an unmanned aerial vehicle, or an airplane), or the like.

In embodiments, an apparatus configured to implement a function of a terminal device is a terminal device, or is an apparatus, for example, a chip system, that supports the terminal device in implementing the function. The apparatus is mounted in the terminal device. In embodiments, the chip system includes a chip, or includes a chip and another discrete component. In the technical solutions provided in embodiments, an example in which the apparatus configured to implement the function of the terminal device is a terminal or UE is used to describe the technical solutions provided in at least one embodiment.

In at least one embodiment, the term "communication" is also described as "data transmission", "information transmission", or "transmission". The technical solutions is used for wireless communication between a scheduling entity and a subordinate entity. Persons skilled in the art use the technical solutions provided in embodiments to perform wireless communication between another scheduling entity and another subordinate entity, for example, wireless communication between a macro base station and a micro base station.

In at least one embodiment, an "indication" includes a direct indication and an indirect indication, or includes an explicit indication and an implicit indication. Information indicated by one piece of information is referred to as to-be-indicated information. In at least one embodiment, the to-be-indicated information is indicated in a plurality of manners, for example, but not limited to, a manner of directly indicating the to-be-indicated information. For example, the to-be-indicated information or an index of the to-be-indicated information is indicated. Alternatively, the to-be-indicated information is indirectly indicated by indicating other information, and there is an association relationship between the other information and the to-be-indicated information. Alternatively, a part of the to-be-indicated information is indicated, and the other part of the to-be-indicated information is already learned of or agreed on in advance. For example, specific information is alternatively indicated by using an arrangement sequence of information that is agreed on in advance (for example, stipulated in a protocol), to reduce indication overheads to some extent.

In at least one embodiment, in response to an indication function of a message being described, the indication function is implemented in a plurality of manners. For example, a message A is used to indicate B in the following several manners: The message A includes indication information for indicating B. Alternatively, a message type of the message A indicates B. Alternatively, the message A includes an information element indicating B.

In embodiments, an SBB includes a synchronization signal/physical broadcast channel block (synchronization signal/PBCH block, SSB). The SS/PBCH block is referred to as an SSB. The SSB includes at least one of the following: a primary synchronization signal (primary synchronization signal, PSS), a secondary synchronization signal (secondary synchronization signal, SSS), and a physical broadcast channel (physical broadcast channel, PBCH).

The following provides examples of the first access network device 101-1 and the second access network device 101-2.

Example 1

Figure 2:
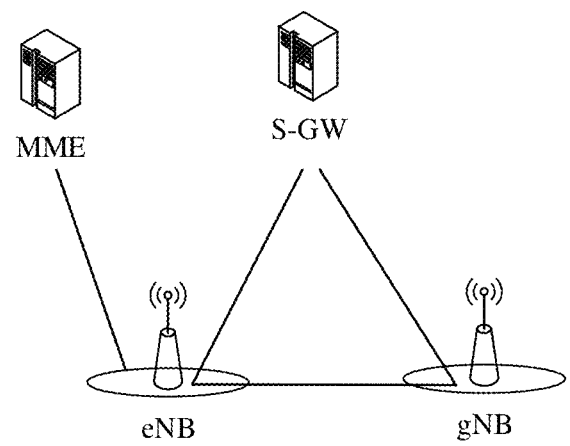
FIG. 2 is a schematic diagram of an architecture of a non-standalone (non-standalone, NSA)-based system according to at least one embodiment.

FIG. 2 is a schematic diagram of an architecture of an NSA-based system according to at least one embodiment. As shown in FIG. 2, a first access network device is a (long term evolution, LTE) access network device (for example, an eNB) in a 4G communication system, and a second access network device is an access network device (for example, a gNB) in 5G NR. The eNB and the gNB is connected through an interface (for example, an X2-C interface). A control plane device of a core network is a mobility management entity (mobility management entity, MME). The eNB and the MME is connected through an interface (for example, an S1 interface). There is no connection between the gNB and the control plane device of the core network. A terminal accesses a network from the eNB, and is connected to the core network. The terminal receives, from the eNB, downlink control plane data from the core network. The terminal is connected to the gNB, and receives downlink data from a data plane of the gNB. A user-plane core network device in 4G is a serving gateway (serving gateway, S-GW). The eNB and the gNB are connected to the S-GW, and is connected through an S1-U interface. After accessing the network from the eNB, the terminal receives downlink user plane data from the eNB and the gNB.

Example 2

Figure 3:
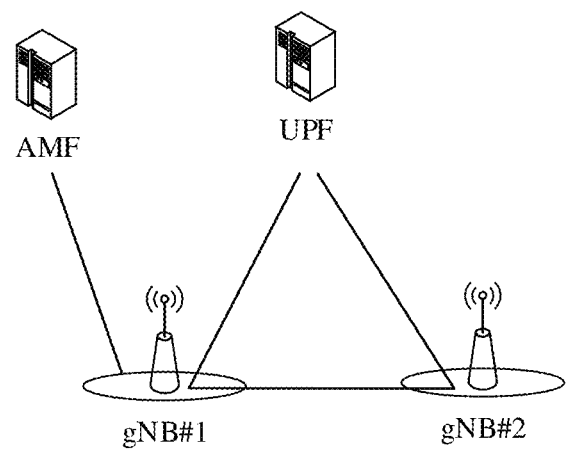
FIG. 3 is a schematic diagram of an architecture of a standalone (standalone, SA)-based system according to at least one embodiment.

FIG. 3 is a schematic diagram of an architecture of an SA-based system according to at least one embodiment. As shown in FIG. 3, a first access network device and a second access network device are base stations (gNBs) in 5G NR. For example, the first access network device is represented by gNB #1, and the second access network device is represented by gNB #2. The two gNBs provides a dual-connectivity (dual-connectivity, DC) service for a terminal. One gNB is used as a master access network device or a master node (master node, MN), and the other gNB is used as a secondary access network device or a secondary node (secondary node, SN). The MN and the SN is connected through an interface (for example, an Xn-C interface). A control plane device of a core network is an access and mobility management function (access and mobility management function, AMF). The MN and the AMF is connected through an interface (for example, an NG-C interface). There is no control plane connection between the SN and the core network. The terminal accesses a network from the MN, and is connected to the core network. The terminal receives, from the MN, downlink control plane data from the core network. A user-plane core network device in NR is a user plane function (user plane function, UPF). The MN and the SN are connected to the UPF, and is connected through an NG-U interface. After accessing the network from the MN, the terminal receives downlink user plane data from the MN and the SN. FIG. 2 and FIG. 3 show architectures in which the control plane and the data plane are separated and to which at least one embodiment described herein is applicable. However, embodiments described herein are not limited to applying to the example architecture in which the control plane and the data plane are separated.

Figure 4:
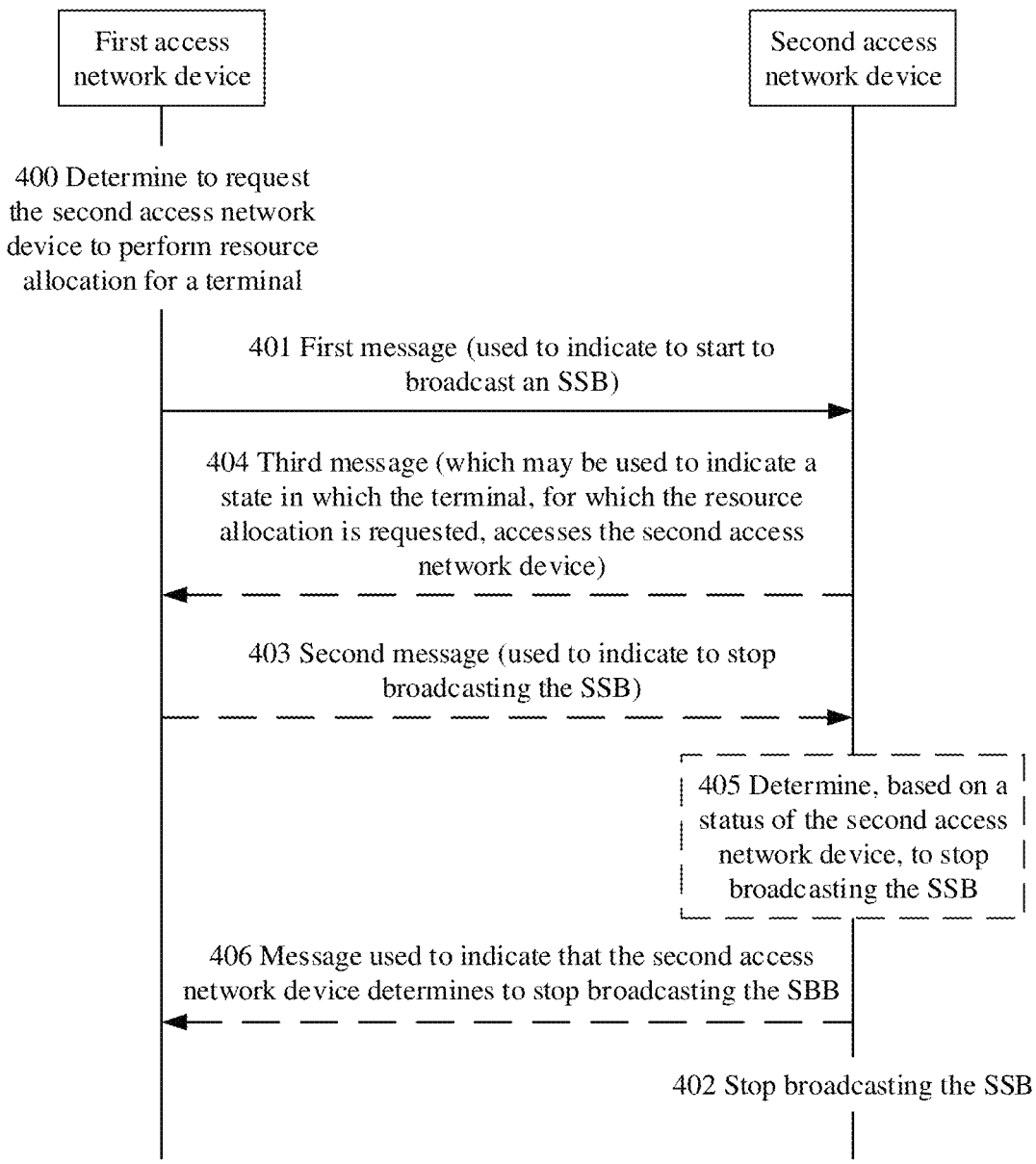
FIG. 4 is a first schematic flowchart of an SBB broadcast method according to at least one embodiment.

As shown in FIG. 4, a specific procedure of an SBB broadcast method provided in an embodiment is as follows.

S400: A first access network device determines to request a second access network device to perform resource allocation for a terminal.

In a dual-connectivity or multi-connectivity scenario, S400 is alternatively: A first access network device determines to add a second access network device as a secondary node (secondary node) of a terminal. Correspondingly, the first access network device is considered as a master access network device, and the master access network device is also referred to as a master node. The second access network device is considered as a secondary access network device, and the secondary access network device is also referred to as a secondary node.

This embodiment is further applicable to another scenario, for example, a handover scenario. Correspondingly, S400 is alternatively: A first access network device determines to hand over a terminal to a second access network device. In this case, the first access network device is considered as a source access network device, and the second access network device is considered as a target access network device.

S401: The first access network device sends a first message to the second access network device, and the second access network device receives the first message from the first access network device. The first message indicates an SSB for the second access network device to broadcast.

For example, the first message includes indication information, and the indication information indicates an SSB for the second access network device to broadcast. Alternatively, a message type of the first message indicates the second access network device to broadcast the SBB. Alternatively, the first message includes an information element that indicates the second access network device to broadcast the SBB. Optionally, the first message indicates one or more cells of the second access network device to broadcast one or more SBBs. For example, the first message carries one or more identifiers of the one or more cells, and indicates the one or more cells to broadcast the one or more SBBs.

In response to the first access network device determining to request the second access network device to perform resource allocation for the terminal, the first access network device indicates the second access network device to broadcast the SBB, so that the second access network device broadcasts the SBB in response to receiving the indication. Compared with a solution in which the second access network device keeps broadcasting the SBB, this reduces energy consumption of the second access network device. The second access network device does not periodically broadcast the SBB, so that the energy consumption of the second access network device is reduced, and therefore, energy consumption of an entire system is reduced.

For example, the first message is alternatively be used to indicate the second access network device to broadcast an SBB and a system information block 1 (System information block 1, SIB 1). In this way, after the second access network device broadcasts the SBB and the SIB 1, the terminal obtains an SIB 1 message of a second access network through an air interface of the second access network, to obtain an access parameter of the second access network without obtaining the access parameter from a radio resource control (RRC) message of the first access network device, so that RRC signaling is reduced.

In at least one embodiment, the first message sent by the first access network device to the second access network device further carries a broadcast periodicity, and the broadcast periodicity is a periodicity for the second access network device to broadcast the SBB. After receiving the first message from the first access network device, the second access network device starts to broadcast the SBB. Certainly, the broadcast periodicity is alternatively carried in a message other than the first message. In response to the second access network device receiving the broadcast periodicity from the first access network device, the second access network device broadcasts the SBB based on the broadcast periodicity indicated by the first access network device.

In at least one embodiment, the second access network device determines a periodicity for the second access network device to broadcast the SBB, and notify the first access network device of the broadcast periodicity. The first access network device further notifies the terminal.

Regardless of whether the second access network device notifies, by using the first access network device, the periodicity for broadcasting the SBB, or the second access network device determines the periodicity for broadcasting the SBB, the second access network device determines the periodicity for broadcasting the SBB. Further, the first access network device notifies the terminal of the periodicity for the second access network device to broadcast the SBB, so that the terminal obtains the periodicity for the second access network device to broadcast the SBB. In this way, the terminal more accurately monitors the SBB broadcast by the second access network device, and the terminal correctly accesses the second access network device.

In at least one embodiment, there is a default periodicity for an access network device to broadcast an SBB. The access network device broadcasts the SBB based on the default periodicity, and the terminal also detects the SBB based on the default periodicity. In this embodiment, the first access network device notifies the second access network device of the periodicity for broadcasting the SBB (which is referred to as the broadcast periodicity for short); or the second access network device determines the broadcast periodicity. This has at least the following beneficial effects. In response to the broadcast periodicity being longer than the default periodicity, the energy consumption is further reduced by prolonging the periodicity for the second access network device to broadcast the SBB. In response to the broadcast periodicity being shorter than the default periodicity, a speed at which the terminal accesses the second access network device is increased by shortening the periodicity for the second access network device to broadcast the SBB. The first access network device further sends the broadcast periodicity to the terminal, so that the terminal obtains the broadcast periodicity for the second access network device to broadcast the SBB. The terminal receives the SBB based on the broadcast periodicity of the second access network device. The terminal is prevented from selecting another network for access because no SBB is found in response to the terminal searching for the SBB based on another periodicity. This helps ensure that the terminal normally accesses the second access network device. An NSA-based architecture is used as an example. An eNB is used as a master access network device, and a gNB is used as a secondary access network device. A periodicity for the gNB to broadcast an SBB (for example, an SSB) is any one of 5 ms, 10 ms, 20 ms, 40 ms, 80 ms, and 160 ms. A shorter periodicity indicates a faster terminal access speed. This is because the terminal quickly finds the SBB, and therefore camps on and accesses a cell. A longer periodicity indicates lower energy consumption. In actual system deployment, an SSB broadcast periodicity of 20 ms is used by default. In response to the gNB being lightly loaded, a broadcast periodicity longer than 20 ms is determined by using the method in this embodiment, to broadcast the SSB, thereby reducing energy consumption of the gNB.

A message name of the first message is not limited. In response to the SBB including the SSB, the first message is an SSB broadcast request (SSB broadcast request) message.

After the second access network device starts to broadcast the SSB, terminals receive the SSB in succession. The terminal performs downlink synchronization based on the SSB, and accesses the second access network device. Alternatively, the terminal performs downlink synchronization based on the SSB, and sends an uplink sounding reference signal (sounding reference signal, SRS), so that the second access network device performs uplink measurement.

After broadcasting the SSB for a period of time, the second access network device stops broadcasting the SSB, to reduce the energy consumption of the second access network device. A trigger occasion for stopping the broadcasting is determined by the second access network device, or is determined by the first access network device and notified to the second access network device.

For example, after S401, the method further includes the following step:

S402: The second access network device stops broadcasting the SBB.

That the second access network device stops broadcasting the SBB is implemented through notification by the first access network device. For example, before S402, the method further includes the following step:

S403: The first access network device sends a second message to the second access network device, and the second access network device receives the second message from the first access network device. The second message indicates an SSB for the second access network device to stop broadcasting.

For example, the second message includes indication information for indicating the second access network device to stop broadcasting the SBB. Alternatively, a message type of the second message indicates the second access network device to stop broadcasting the SBB. Alternatively, the second message includes an information element that indicates the second access network device to stop broadcasting the SBB. Optionally, the second message indicates, at a cell granularity, to stop broadcasting the SBB. For example, the second message carries one or more identifiers of one or more cells, and indicates the one or more cells to stop broadcasting one or more SBBs.

A message name of the second message is not limited. For example, the second message is a RAN configuration update (RAN configuration update) message.

The first access network device determines, according to a specific policy, to send the second message to the second access network device. For example, the first access network device determines whether to send the second message to the second access network device, depending on whether the second access network device continues to provide a resource for the terminal. An embodiment is shown by step S404 before step S403.

S404: The second access network device sends a third message to the first access network device, and the first access network device receives the third message from the second access network device. The third message indicates a state in which the terminal accesses the second access network device.

Specifically, the third message includes indication information used to indicate the state in which the terminal accesses the second access network device. Alternatively, a message type of the third message indicates the state in which the terminal accesses the second access network device. Alternatively, the third message includes an information element that indicates the state in which the terminal accesses the second access network device.

The state in which the terminal accesses the second access network device is a state in which the terminal, for which the resource allocation is requested, accesses the second access network device in S400. The state in which the terminal accesses the second access network device includes:

(1) Terminals have accessed the second access network device.

(2) A part of terminals has accessed the second access network device.

In case (2), the third message carries an identifier of the terminal that accesses the second access network device; the third message carries an identifier of a terminal that does not access the second access network device; or the third message carries an identifier of a terminal for which resource allocation is requested, and information indicating whether the terminal corresponding to the identifier accesses the second access network device.

In response to the third message carrying the identifier of the terminal that accesses the second access network device, the first access network device determines, based on the identifier of the terminal that accesses the second access network device, a terminal that does not access the second access network device.

In response to the third message carrying the identifier of the terminal that does not access the second access network device, the first access network device determines, based on the identifier of the terminal that does not access the second access network device, a terminal that has accessed the second access network device. Optionally, the second access network device obtains, in the following manner, the identifier of the terminal that does not access the second access network device: The first access network device requests the second access network device to perform resource allocation for a plurality of terminals. For example, the first access network device sends, to the second access network device, a message for requesting to perform resource allocation for the plurality of terminals, where the message includes identifiers of the plurality of terminals for which the resource allocation is requested. The second access network device determines, based on the identifiers of the plurality of terminals and a terminal that has accessed the second access network device, the identifier of the terminal that does not access the second access network device.

In response to the third message carrying the identifier of a terminal for which the resource allocation is requested, and the information indicating whether the terminal corresponding to the identifier accesses the second access network device, the first access network device determines, based on the information carried in the third message, a state in which the terminal, for which the resource allocation is requested, accesses the second access network device.

(3) The terminal, for which the resource allocation is requested, is in a state of accessing one or more cells of the second access network device.

In case (3), the third message carries an identifier of the terminal, an identifier of the cell, and indication information, to indicate the state in which the terminal, for which the resource allocation is requested, accesses the cell served by the second access network device. Alternatively, the third message indicates a terminal access status of cells served by the second access network device. A terminal access status of one cell includes: Terminals for which the cell is requested to be allocated as an SN and that are located in a service range of the cell have successfully accessed the cell; or a part of terminals for which the cell is requested to be allocated as an SN and that are located in a service range of the cell successfully access the cell; or whether a terminal, for which the cell is requested to be allocated as an SN, accesses the cell cannot be determined.

In response to the third message indicating, at the cell granularity, the state in which the terminal, for which the resource allocation is requested, accesses the second access network device, the first access network device also sends the second message to the second access network device at the cell granularity. That is, the second message indicates one or more cells to stop broadcasting one or more SBBs.

A message name of the third message is not limited. For example, the third message is an access report message.

Based on S404, the first access network device determines, based on the third message sent by the second access network device, to send the second message to the second access network device, and determine content indicated by the second message.

In at least one embodiment in which the second access network device stops broadcasting the SBB is that the second access network device determines, based on a status of the second access network device, to stop broadcasting the SBB. For example, before S402, the method further includes the following step:

S405: The second access network device determines, based on the status of the second access network device, to stop broadcasting the SBB.

For example, the first access network device determines to request the second access network device to perform resource allocation for a terminal 1, a terminal 2, and a terminal 3. The first access network device sends the first message to the second access network device, to indicate the second access network device to broadcast the SBB. In response to the terminal 1, the terminal 2, and the terminal 3 successfully accessing the second access network device, for example, the terminal 1, the terminal 2, and the terminal 3 complete initial access, the second access network device determines to stop broadcasting the SBB. Alternatively, after the second access network device receives a message indicating that the terminal 1, the terminal 2, and the terminal 3 successfully perform access, the second access network device determines to stop broadcasting the SBB. After the terminal 1, the terminal 2, and the terminal 3 successfully access the second access network device, the second access network device starts a timer. In response to the second access network device receiving, before the timer expires, again a message indicating to start to broadcast an SBB (for example, the first access network device sends the message again in response to the second access network device performing resource allocation for another terminal), the second access network device continues to broadcast the SBB. In response to the second access network device not receiving, after the timer expires, the message indicating to broadcast the SBB, the second access network device stops broadcasting the SBB.

In response to the second access network device determining to stop broadcasting the SBB, the second access network device further notifies the first access network device that the second access network device determines to stop broadcasting the SBB. For example, after S405, the method further includes S406.

S406: The second access network device sends, to the first access network device, a message used to indicate that the second access network device determines to stop broadcasting the SBB, and the first access network device receives the message from the second access network device.

There is no limitation on an execution sequence of S402 and S406, and S402 and S406 is performed interchangeably or simultaneously.

In this way, the first access network device determines that the second access network device has determined to stop broadcasting the SBB. In addition, in response to the second access network device performing resource allocation for the terminal subsequently, the first access network device sends a message that has a function the same as/similar to that of the first message to the second access network device again. Optionally, the second access network device notifies, at the cell granularity, the first access network device of stopping of broadcasting the SBB. For example, one or more identifiers of one or more cells are included in a notification message, to indicate to the first access network device that the second access network device determines to stop broadcasting one or more SBBs for the one or more cells indicated by the one or more identifiers of the one or more cells.

In conclusion, the first access network device indicates the second access network device to start to broadcast the SBB. This reduces the energy consumption caused because the second access network device keeps broadcasting the SBB, so that overheads of the entire system are reduced. The second access network device is indicated to disable broadcasting of the SBB, so that the energy consumption caused by broadcasting the SBB by the second access network device is further reduced, and therefore, the overheads of the entire system are reduced.

Figure 5:
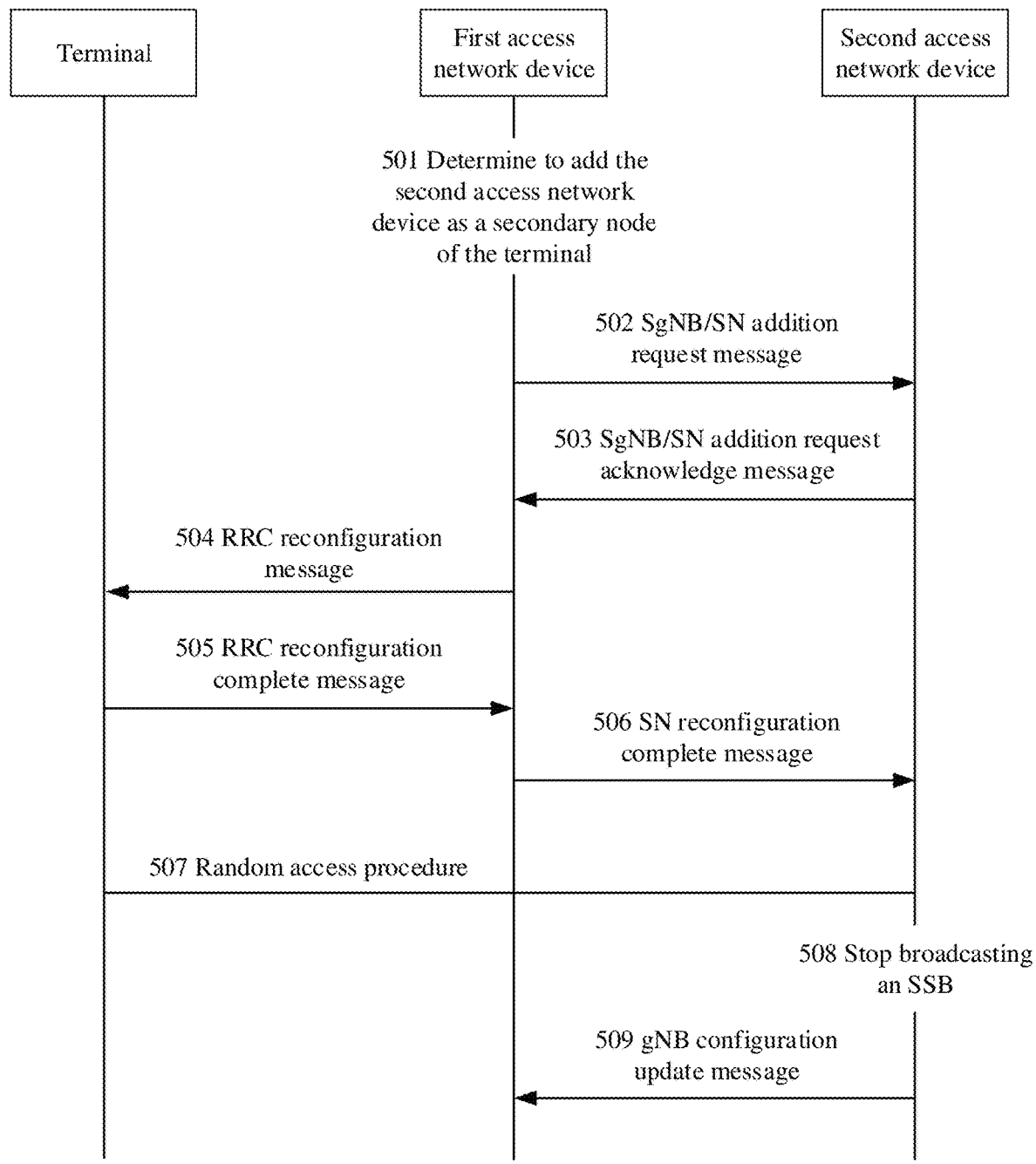
FIG. 5 is a second schematic flowchart of an SBB broadcast method according to at least one embodiment.

Based on the foregoing descriptions, the following further describes the SBB broadcast method in detail by using a dual-connectivity architecture or a multi-connectivity architecture in at least one embodiment. The first access network device is a master access network device. As shown in FIG. 5, an embodiment of a process is described as follows.

S501: The first access network device determines to add the second access network device as the secondary node (SN) of the terminal.

In the scenario of the dual-connectivity architecture or the multi-connectivity architecture, S400 of determining, by the access network device, that the second access network device performs resource allocation for the terminal is described as S501.

S502: The first access network device sends an SgNB/SN addition request (SgNB addition request) message to the second access network device. The second access network device receives the SgNB/SN addition request message from the first access network device.

In at least one embodiment, the SgNB/SN addition request message carries indication information. For example, the indication information is referred to as first indication information, and the first indication information indicates an SSB for the second access network device to broadcast. Optionally, the SgNB/SN addition request message further carries a broadcast periodicity for the second access network device to broadcast the SBB, and the broadcast periodicity is denoted as a broadcast periodicity 1.

In response to receiving the SgNB/SN addition request message, the second access network device starts to broadcast the SBB.

In at least one embodiment, the SgNB/SN addition request message does not include the first indication information. To be specific, the first access network device does not include, in the SgNB/SN addition request message, indication information for indicating the second access network device to broadcast the SBB. Alternatively, the SgNB/SN addition request message includes second indication information, and the second indication information indicates a condition for the second access network device to broadcast the SBB. For example, the condition is that after receiving an SN reconfiguration complete message, the second access network device starts to broadcast the SBB. For another example, the condition is alternatively that after specified duration elapses after receiving the SgNB/SN addition request, the second access network device starts to broadcast the SBB. In this embodiment, the second access network device does not immediately broadcast the SBB In response to receiving the SgNB/SN addition request. Therefore, at least one embodiment is applicable to a case in which a terminal does not immediately monitor an SBB of an SN in response to an MN determining to add the SN for the terminal. For example, at least one embodiment is applicable to a scenario in which SN preconfiguration is performed for a terminal. The SN preconfiguration means that an RRC configuration process of an SN is performed for the terminal, but the terminal does not access the SN. In other words, the terminal does not perform a random access procedure with the SN.

S503: The second access network device sends an SgNB/SN addition request acknowledge (SgNB addition request acknowledge) message to the first access network device. The first access network device receives the SgNB/SN addition request acknowledge message from the second access network device.

In response to the second access network device broadcasting the SBB after S502, optionally, the SgNB/SN addition request acknowledge message carries a broadcast periodicity for the second access network device to broadcast the SBB, and the broadcast periodicity is denoted as a broadcast periodicity 2. In response to the second access network device receiving the broadcast periodicity 1 in S502, the broadcast periodicity 2 is the same as or different from the broadcast periodicity 1. To be specific, in response to receiving the broadcast periodicity 1, the second access network device broadcasts the SBB not based on the broadcast periodicity 1, but determines the SBB broadcast periodicity 2, and notifies the first access network device of the broadcast periodicity 2.

S504: The first access network device sends an RRC reconfiguration (RRC connection reconfiguration) message to the terminal. The terminal receives the RRC reconfiguration message from the first access network device.

Optionally, the RRC reconfiguration message includes a broadcast periodicity for the second access network device to broadcast the SBB. For example, in response to the first access network device not receiving the broadcast periodicity 2 notified by the second access network device, the broadcast periodicity included in the RRC reconfiguration message is the broadcast periodicity 1. In response to the first access network device receiving the broadcast periodicity 2 notified by the second access network device, the broadcast periodicity included in the RRC reconfiguration message is the broadcast periodicity 2.

In response to a default SBB broadcast periodicity being 20 ms, the second access network device broadcasts the SBB based on a shorter periodicity, for example, broadcast the SBB based on a broadcast periodicity of 5 ms. In this way, the terminal accesses the second access network device more quickly. Alternatively, the second access network device broadcasts the SBB based on a longer periodicity, for example, broadcast the SBB based on a periodicity of 160 ms. This further reduces energy consumption of the second access network device. The second access network device notifies the first access network device of the SBB broadcast periodicity, and the first access network device notifies the terminal of the periodicity for the second access network device to broadcast the SBB, so that the terminal leans of the broadcast periodicity for the second access network device to broadcast the SBB. In this way, the terminal is prevented from selecting another network for access because no SBB is found in response to the terminal searching for the SBB based on the default broadcast periodicity. For example, the terminal searches for the SBB based on the default broadcast periodicity of 20 ms. However, actually, the periodicity for the second access network device to broadcast the SBB is 160 ms. In response to the terminal finding no SBB within 20 ms, the terminal selects another network for access. As a result, the terminal fails to access the second access network device. The terminal is notified of the broadcast periodicity for the second access network device to broadcast the SBB, so that this problem is avoided, and the terminal accesses the second access network device more accurately.

S505: The terminal sends an RRC reconfiguration complete (RRC connection reconfiguration complete) message to the first access network device, and the first access network device receives the RRC reconfiguration complete message from the terminal.

S506: The first access network device sends an SN reconfiguration complete (SgNB reconfiguration complete) message to the second access network device. The second access network device receives the SN reconfiguration complete message from the first access network device.

In response to the SgNB/SN addition request message in S502 not carrying the first indication information, that is, the first access network device does not indicate the second access network device to broadcast the SBB, the SN reconfiguration complete message includes the first indication information, used to indicate the second access network device to broadcast the SBB. In other words, in the embodiment shown in FIG. 4, the first message sent by the first access network device to the second access network device is the SgNB/SN addition request message in S502, or is the SN reconfiguration complete message in S506. In response to the first message being the SN reconfiguration complete message in S506, the first message is applicable to the SN preconfiguration scenario described in S502. In this way, power consumption of broadcasting the SBB by the SN is further reduced, and power consumption of an entire system of the dual-connectivity architecture or the multi-connectivity architecture is reduced.

In response to the first indication information being carried in S502, S507 and S508 are further performed after S506.

S507: The terminal accesses the second access network device through a random access procedure (random access procedure), and after the access, the second access network device is used as an SN in the dual-connectivity architecture or the multi-connectivity architecture to serve the terminal.

S508: The second access network device stops broadcasting the SBB.

After the terminal accesses the second access network device, the second access network device stops broadcasting the SBB. In at least one embodiment, the first access network device requests to add the second access network device as the SN for a plurality of terminals. In this case, the second access network device determines, based on access statuses of the plurality of terminals, whether to stop broadcasting SBBs. Alternatively, the second access network device stops broadcasting the SBB after receiving a message used by the first access network device to indicate to stop broadcasting the SBB. For details of a related solution in which the second access network device stops broadcasting the SBB, refer to the descriptions of the embodiment shown in FIG. 4. The second access network device stops, in a timely manner, broadcasting the SBB, so that the power consumption of the second access network device is reduced.

S509: The second access network device sends a gNB configuration update (gNB configuration update) message to the first access network device.

Optionally, the message carries indication information, which is denoted as third indication information. The third indication information indicates that the SN determines to stop or has stopped broadcasting the SBB.

It is understood that the descriptions of the embodiment shown in FIG. 5 and the embodiment shown in FIG. 4 are mutually referenced and supplemented.

Figure 6:
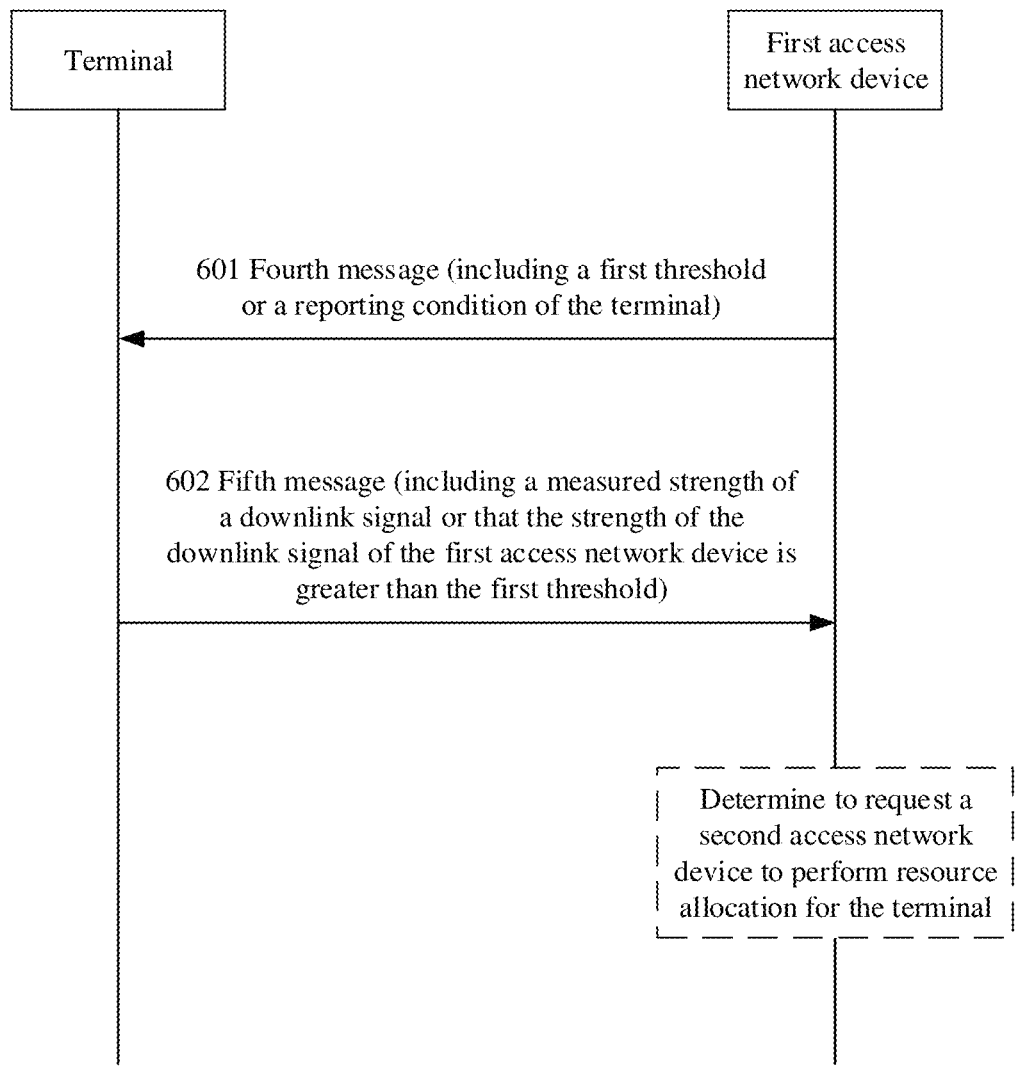
FIG. 6 is a schematic flowchart of a communication method according to at least one embodiment.

Based on the descriptions of the foregoing embodiment, FIG. 6 shows a communication method according to at least one embodiment. As shown in FIG. 6, before the first access network device determines to request the second access network device to perform resource allocation for the terminal, the method further includes the following steps.

S601: The first access network device sends a fourth message to the terminal, and the terminal receives the fourth message from the first access network device.

The fourth message includes a threshold, which is denoted as a first threshold. Alternatively, the fourth message indicates a reporting condition of the terminal. For example, the reporting condition includes that the terminal triggers reporting in response to a measured strength of a downlink signal of the first access network device being greater than or equal to a first threshold.

Optionally, the fourth message is a broadcast message. The broadcast message includes trigger event information. The trigger event information indicates the first threshold. Alternatively, the trigger event information indicates the reporting condition of the terminal. For example, the reporting condition includes that the terminal triggers reporting in response to the measured strength of the downlink signal of the first access network device being greater than or equal to the first threshold.

Optionally, the fourth message alternatively includes measurement configuration information. In this case, the fourth message is an RRC message, for example, an RRC reconfiguration message. The measurement configuration information indicates the first threshold; or the measurement configuration information indicates the reporting condition of the terminal, and the reporting condition includes that the terminal triggers reporting in response to the measured strength of the downlink signal of the first access network device being greater than or equal to the first threshold.

In this embodiment, the strength of the downlink signal is a power or a signal-to-noise ratio of the downlink signal.

S602: The terminal sends a fifth message to the first access network device, and the first access network device receives the fifth message from the terminal.

The fifth message includes the strength that is of the downlink signal of the first access network device and that is measured by the terminal; or the fifth message indicates the strength is of the downlink signal of the first access network device and that the strength is greater than or equal to the first threshold.

In response to receiving the fourth message from the first access network device, the terminal determines, based on the first threshold or the reporting condition included in the fourth message, whether the measured strength of the downlink signal of the first access network device is greater than or equal to the first threshold. If yes, it indicates that the reporting condition is satisfied, and the terminal triggers reporting of the fifth message.

In response to the fourth message being the broadcast message, the fifth message is an RRC message; or in response to the fourth message including the measurement configuration information, the fifth message is a measurement report.

In response to the fourth message includes the first threshold, the fifth message includes the strength that is of the downlink signal of the first access network device and that is measured by the terminal. In response to the fourth message including the first threshold, the fifth message is alternatively used to indicate that the strength that is of the downlink signal of the first access network device and that is measured by the terminal is greater than or equal to the first threshold. In response to the fourth message being used to indicate the reporting condition of the terminal, the fifth message includes the strength that is of the downlink signal of the first access network device and that is measured by the terminal. In response to the fourth message being used to indicate the reporting condition of the terminal, the fifth message is alternatively used to indicate that the strength that is of the downlink signal of the first access network device and that is measured by the terminal is greater than or equal to the first threshold.

After S602, S400 in the embodiment shown in FIG. 4 is performed. To be specific, the first access network device determines to request the second access network device to perform resource allocation for the terminal. The first access network device determines, based on the strength that is of the downlink signal of the first access network device, that is measured by the terminal, and that is included in the fifth message, whether the strength that is of the downlink signal of the first access network device and that is measured by the terminal is greater than or equal to the first threshold. If yes, the first access network device determines to request the second access network device to perform resource allocation for the terminal. Alternatively, in response to the fifth message being used to indicate that the strength that is of the downlink signal of the first access network device and that is measured by the terminal being greater than or equal to the first threshold, the first access network device determines, based on the fifth message, to request the second access network device to perform resource allocation for the terminal.

The determining, by the first access network device based on the fifth message, to request the second access network device to perform resource allocation for the terminal is implemented in the following manners. The first access network device obtains a relationship between a strength of a downlink signal of the first access network device and a strength of a downlink signal of the second access network device (which is referred to as a signal relationship for short). For example, in response to a strength (or a signal strength range) of a downlink signal received by the terminal from the first access network device being A, a strength (or a signal strength range) of a downlink signal received by the terminal from the second access network device is B, and there is a relationship between A and B. The first access network device obtains the signal relationship from a core network device or an operation, administration and maintenance (operation, administration and maintenance, OAM) device. The first access network device alternatively obtains the signal relationship based on historical measurement information.

In response to receiving the fifth message from the terminal, the first access network device determines, based on the signal relationship, a strength of a downlink signal that is of the second access network device and that is to be received by the terminal. Further, the first access network device determines, based on the determined strength of the downlink signal that is of the second access network device and that is to be received by the terminal, that the first access network device requests the second access network device to perform resource allocation for the terminal.

In at least one embodiment, the first access network device does not perform further determining based on the signal relationship, but considers the signal relationship during setting of the first threshold. In other words, once receiving the fifth message, the first access network device determines that the first access network device requests the second access network device to perform resource allocation for the terminal.

Figure 7:
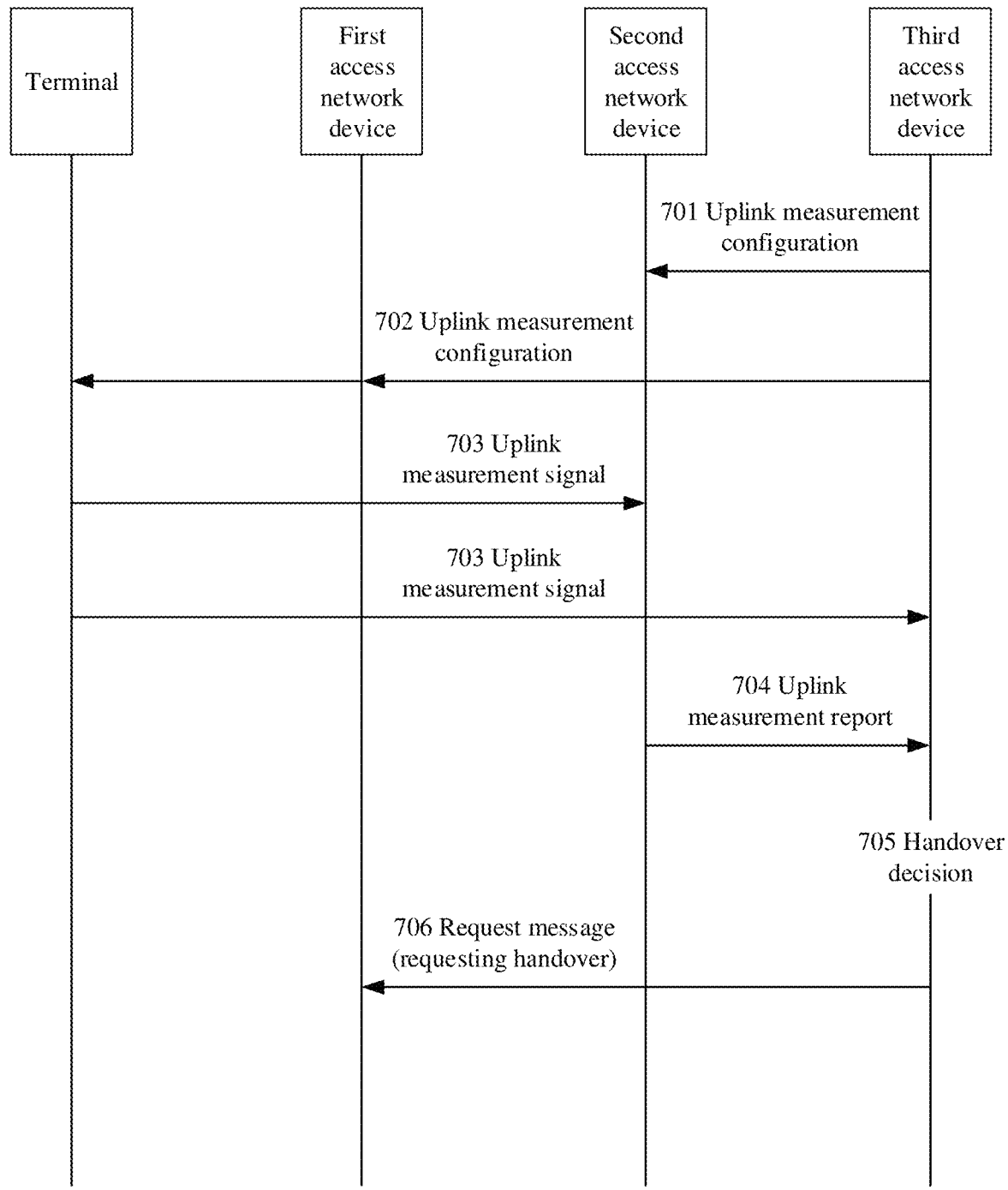
FIG. 7 is a schematic flowchart of another communication method according to at least one embodiment.

FIG. 7 shows another communication method according to at least one embodiment. As shown in FIG. 7, a third access network device is used as a secondary access network device to serve a terminal, and a first access network device is used as a master access network device to serve the terminal. The embodiment shown in FIG. 7 describes that the secondary access network device of the terminal is to be handed over from the third access network device to a second access network device. In this scenario, that the first access network device determines to request the second access network device to perform resource allocation for the terminal in S400 is understood as that the first access network device determines to hand over the secondary access network device of the terminal from the third access network device to the second access network device.

Specifically, before that the first access network device determines to request the second access network device to perform resource allocation for the terminal, the method further includes the following steps.

S701: The third access network device sends an uplink measurement configuration to the second access network device, and the second access network device receives the uplink measurement configuration from the third access network device.

The uplink measurement configuration includes information about a resource of an uplink measurement signal, and the uplink measurement configuration indicates to the second access network device to receive the uplink measurement signal from the terminal. After receiving the uplink measurement configuration, the second access network device receives, on the resource indicated by the uplink measurement configuration, the uplink measurement signal sent by the terminal, to determine whether the terminal moves to a service range of the second access network device. Optionally, the uplink measurement configuration further includes a second threshold or event trigger information. The second threshold or the event trigger information indicates to the second access network device to perform S704, that is, send an uplink measurement report to the third access network device, after a specific condition is satisfied. For example, in response to a strength of an uplink measurement signal received by the second access network device from the terminal being greater than the second threshold, the second access network device sends the uplink measurement report to the third access network device. The strength of the uplink measurement signal is a power or a signal-to-noise ratio of the uplink measurement signal.

The uplink measurement configuration further includes an identifier of the terminal. The uplink measurement signal is an SRS.

The uplink measurement configuration is carried in an X2AP/XnAP message. The X2AP message is an application (application) layer message transmitted through an X2 interface, and the XnAP message is an application layer message transmitted through an Xn interface.

S702: The third access network device sends the uplink measurement configuration to the terminal, and the terminal receives the uplink measurement configuration.

The third access network device first sends the uplink measurement configuration to the first access network device, and the first access network device forwards the uplink measurement configuration to the terminal. The uplink measurement configuration includes information about a resource for sending the uplink measurement signal.

The third access network device sends the uplink measurement configuration to the terminal, so that the terminal determines the information about the resource for sending the uplink measurement signal. The terminal sends the uplink measurement signal on the resource indicated by the uplink measurement configuration.

There is no strict execution sequence between S701 and S702, and S701 and S702 are performed simultaneously or are performed interchangeably.

S703: The terminal sends the uplink measurement signal.

The second access network device receives the uplink measurement signal from the terminal, and the third access network device also receives the uplink measurement signal from the terminal.

S704: The second access network device sends the uplink measurement report to the third access network device, and the third access network device receives the uplink measurement report from the second access network device.

The second access network device sends, based on the second threshold or the event trigger information in the uplink measurement configuration, the uplink measurement report to the third access network device in response to the condition indicated by the second threshold or the event trigger information being satisfied. The uplink measurement report includes information indicating that the strength of the uplink measurement signal received by the second access network device from the terminal is greater than the second threshold. The uplink measurement report is carried in an X2AP/XnAP message. The uplink measurement report includes indication information, used to indicate that the strength of the uplink measurement signal received by the second access network device from the terminal is greater than or equal to the second threshold. Alternatively, the uplink measurement report includes a strength value of the uplink measurement signal received by the second access network device from the terminal.

The uplink measurement report is at a cell level, and is specific to one or more cells. In response to the uplink measurement report being at the cell level, the uplink measurement report further carries a cell identifier, representing that a strength of an uplink measurement signal of a cell indicated by the cell identifier is greater than the second threshold.

S705: The third access network device makes a handover decision, to determine that the secondary access network device of the terminal is to be handed over from the third access network device to the second access network device.

Regardless of whether the third access network device receives an uplink measurement signal sent by the terminal, the third access network device makes the handover decision based on the uplink measurement report sent by the second access network device. For example, in response to the third access network device determining, based on the uplink measurement report, that the strength of the uplink measurement signal received by the second access network device from the terminal is greater than the second threshold, the third access network device determines to perform handover.

In response to the third access network device receiving the uplink measurement signal sent by the terminal, the third access network device further makes the handover decision with reference to the uplink measurement report sent by the second access network device and the uplink measurement signal received by the third access network device from the terminal. For example, the third access network device compares the uplink measurement signal received by the third access network device from the terminal with the uplink measurement signal that is received by the second access network device from the terminal and that is in the uplink measurement report received from the second access network device in S704. In response to the uplink measurement signal that is received by the second access network device from the terminal and that is in the uplink measurement report being greater than or equal to the uplink measurement signal received by the third access network device from the terminal, the third access network device determines a handover event. Alternatively, in response to a difference between the uplink measurement signal that is received by the second access network device from the terminal and that is in the uplink measurement report and the uplink measurement signal received by the third access network device from the terminal being greater than a specified threshold, the third access network device determines a handover event.

S706: The third access network device sends a sixth message to the first access network device, and the first access network device receives the sixth message from the third access network device.

The sixth message indicates that the secondary access network device of the terminal is to be handed over from the third access network device to the second access network device.

For example, the request message is an SN change required (SN change required) message.

The request message includes an identifier of the second access network device, and in response to the request message being a handover indication at a cell granularity, the request message includes an identifier of a cell served by the second access network device.

After S706, the first access network device determines to hand over the secondary access network device of the terminal from the third access network device to the second access network device.

Alternatively, after S706, S400 in the embodiment shown in FIG. 4 or S501 in the embodiment shown in FIG. 5 is performed, that is, the first access network device determines to request the second access network device to perform resource allocation for the terminal.

Figure 8:
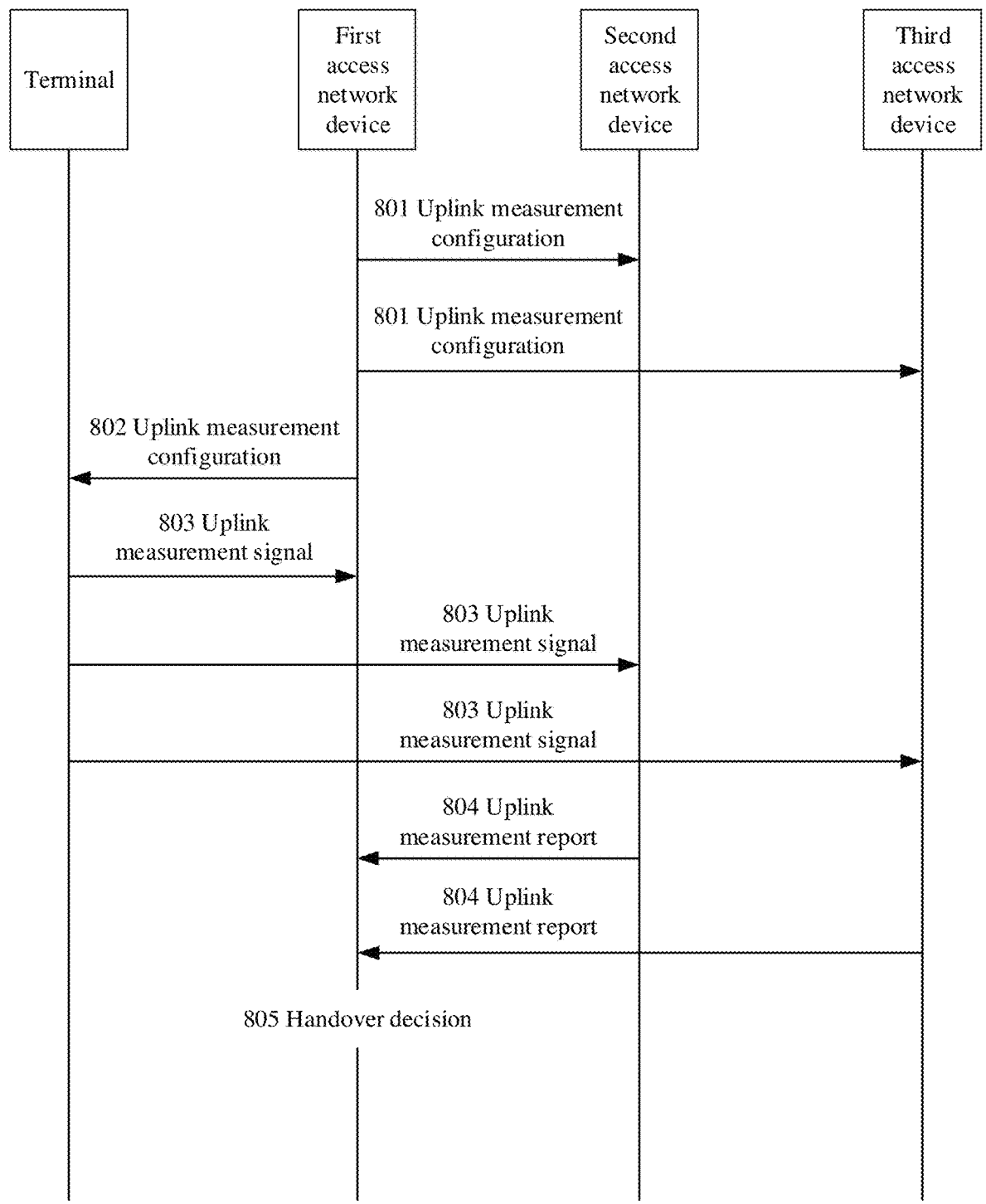
FIG. 8 is a schematic flowchart of still another communication method according to at least one embodiment.

Based on the descriptions of the foregoing embodiment, FIG. 8 shows another communication method according to at least one embodiment. As shown in FIG. 8, the third access network device is used as the secondary access network device to serve the terminal, and the first access network device is used as the master access network device to serve the terminal. The embodiment shown in FIG. 8 describes that the secondary access network device of the terminal is to be handed over from the third access network device to the second access network device. In this scenario, that the first access network device determines to request the second access network device to perform resource allocation for the terminal in S400, and the first access network device determines to hand over the secondary access network device of the terminal from the third access network device to the second access network device.

Specifically, the determining, by the first access network device, to request the second access network device to perform resource allocation for the terminal is implemented in the following manner.

S801: The first access network device respectively sends uplink measurement configurations to the second access network device and the third access network device, and the second access network device and the third access network device respectively receive the uplink measurement configurations from the first access network device.

The uplink measurement configurations includes information about a resource of an uplink measurement signal, and the uplink measurement configurations indicates to the second access network device and the third access network device to receive the uplink measurement signal from the terminal. After receiving the uplink measurement configurations, the second access network device and the third access network device receives, on the resource indicated by the uplink measurement configurations, the uplink measurement signal sent by the terminal. Optionally, the uplink measurement configuration further includes a second threshold or eventtrigger information. The second threshold or the event trigger information indicates to the second access network device or the third access network device to send an uplink measurement report to the first access network device after a specific condition is satisfied. For example, in response to a strength of the uplink measurement signal received by the second access network device or the third access network device from the terminal being greater than the second threshold, the second access network device or the third access network device sends the uplink measurement report to the third access network device. Thresholds in the uplink measurement configurations sent by the first access network device to the second access network device and the third access network device are the same or different. In response to the thresholds being different, the second access network device and the third access network device separately determine, based on the received thresholds, whether a reporting condition is satisfied, and send uplink measurement reports to the first access network device in response to the reporting condition being satisfied.

S802: The first access network device sends the uplink measurement configuration to the terminal, and the terminal receives the uplink measurement configuration.

The uplink measurement configuration includes information about a resource for sending the uplink measurement signal. The terminal determines, based on the uplink measurement configuration, the information about the resource for sending the uplink measurement signal. The terminal sends the uplink measurement signal on the resource indicated by the uplink measurement configuration.

There is no strict execution sequence between S801 and S802, and S801 and S802 are performed simultaneously or are performed interchangeably.

S803: The terminal sends the uplink measurement signal.

The first access network device, the second access network device, and the third access network device receives the uplink measurement signal from the terminal.

S804: The second access network device/third access network device sends the uplink measurement report to the first access network device, and the first access network device receives the uplink measurement report from the second access network device/third access network device.

For this step, refer to the descriptions of S704. For a method for sending the uplink measurement report by the third access network device to the first access network device, refer to the method for sending the uplink measurement report by the second access network device to the first access network device. Details are not described herein again.

S805: The first access network device makes a handover decision, to determine that the secondary access network device of the terminal is to be handed over from the third access network device to the second access network device. To be specific, the first access network device determines to request the second access network device to perform resource allocation for the terminal.

For a method for making the handover decision by the first access network device, refer to the method for making the handover decision by the third access network device in S705. In other words, the first access network device directly makes the handover decision based on the received uplink measurement report; or the first access network device makes the handover decision by comparing the uplink measurement signal received by the first access network device with an uplink measurement signal in the uplink measurement report. For a specific method, refer to description details of S705. Details are not described herein again.

Figure 9:
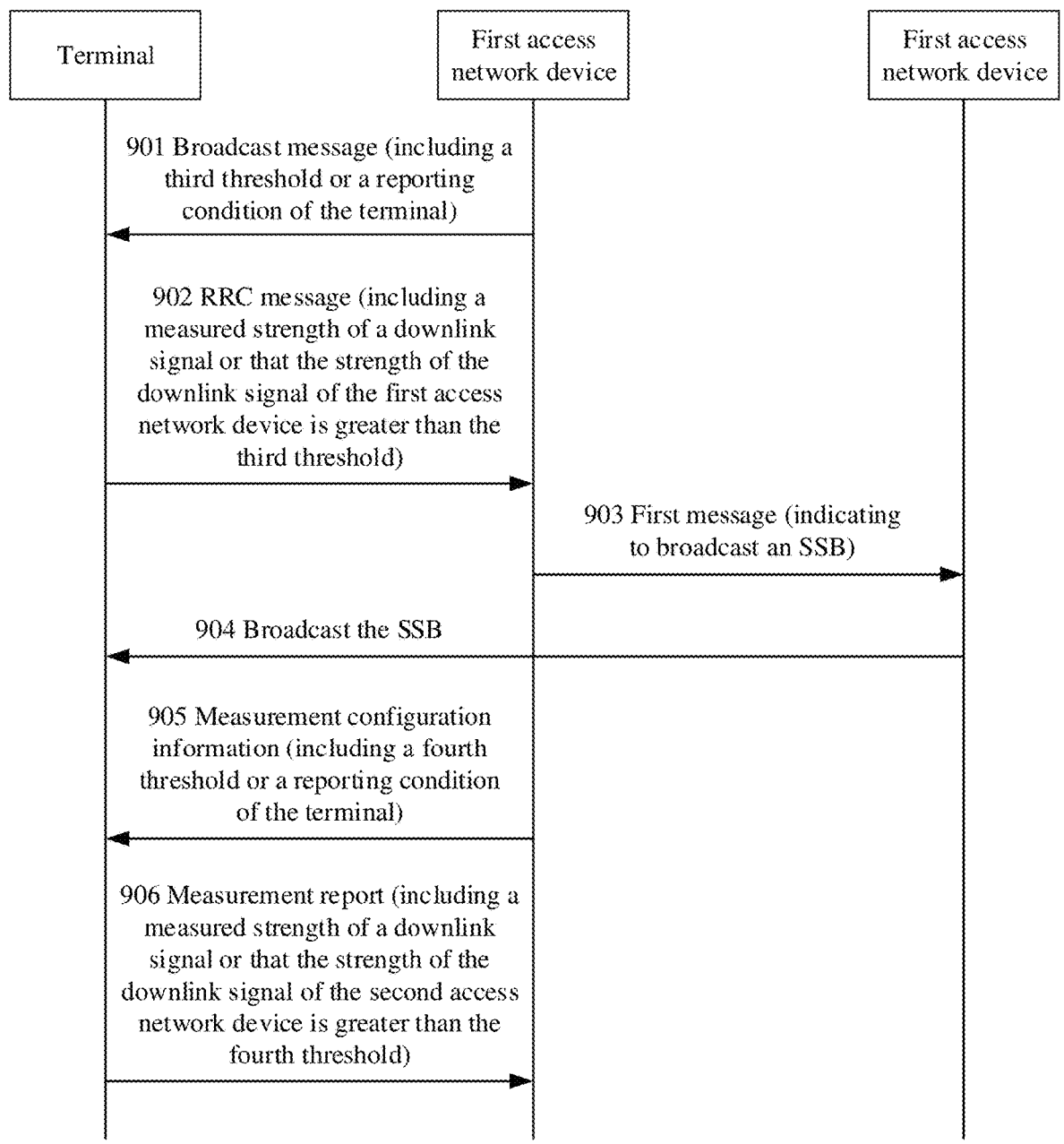
FIG. 9 is a third schematic flowchart of an SBB broadcast method according to at least one embodiment.

Based on the descriptions of the foregoing embodiment, FIG. 9 shows another SBB broadcast method according to at least one embodiment. As shown in FIG. 9, the method includes the following steps.

S901: The first access network device sends a broadcast message to the terminal, and the terminal receives the broadcast message from the first access network device.

The broadcast message includes trigger event information. The trigger event information indicates a third threshold. Alternatively, the trigger event information indicates a reporting condition of the terminal. For example, the reporting condition includes that the terminal triggers reporting in response to a measured strength of a downlink signal of the first access network device being greater than or equal to a third threshold.

S902: The terminal sends a message, which is, for example, an RRC message, to the first access network device, and the first access network device receives the RRC message from the terminal.

The RRC message includes the strength that is of the downlink signal of the first access network device and that is measured by the terminal; or the RRC message indicates that the strength is of the downlink signal of the first access network device and that the strength is greater than or equal to the third threshold. The third threshold is the same as the foregoing first threshold.

S903: The first access network device sends a first message to the second access network device, and the second access network device receives the first message from the first access network device. The first message indicates the second access network device to broadcast an SBB.

For details of step S903, refer to step S401.

Specifically, in response to the first access network device preliminarily determining, based on the RRC message reported by the terminal, that the first access network device requests the second access network device to perform resource allocation for the terminal, the first access network device sends the first message to the second access network device, to indicate the second access network device to broadcast the SBB.

S904: The second access network device broadcasts the SBB based on the first message.

S905: The first access network device sends measurement configuration information to the terminal, and the terminal receives the measurement configuration information from the first access network device. The measurement configuration information indicates to the terminal to measure a downlink signal of the second access network device. For example, the downlink signal is an SBB.

The measurement configuration information includes a fourth threshold. Alternatively, the measurement configuration information indicates a reporting condition of the terminal. For example, the reporting condition includes that the terminal triggers reporting in response to a measured strength of the downlink signal of the second access network device being greater than or equal to a fourth threshold.

The terminal measures the downlink signal of the second access network device based on the measurement configuration information.

S906: The terminal sends a measurement report to the first access network device, and the first access network device receives the measurement report from the terminal.

The terminal triggers reporting in response to the measured SBB broadcast by the second access network device satisfying the reporting condition.

The first access network device more accurately determines, based on the measurement report sent by the terminal, whether the second access network device is suitable to perform resource allocation for the terminal. If yes, a state in which the second access network device broadcasts the SBB is maintained; otherwise, the second access network device is indicated to stop broadcasting the SBB.

According to the method in the embodiment shown in FIG. 9, the first access network device more accurately determines whether the first access network device is suitable to request the second access network device to perform resource allocation for the terminal. If yes, the second access network device keeps broadcasting the SBB, to facilitate access of the terminal. If not, the first access network device indicates the second access network device to stop broadcasting the SBB, to reduce energy consumed by the second access network device to broadcast the SBB.

Figure 10:
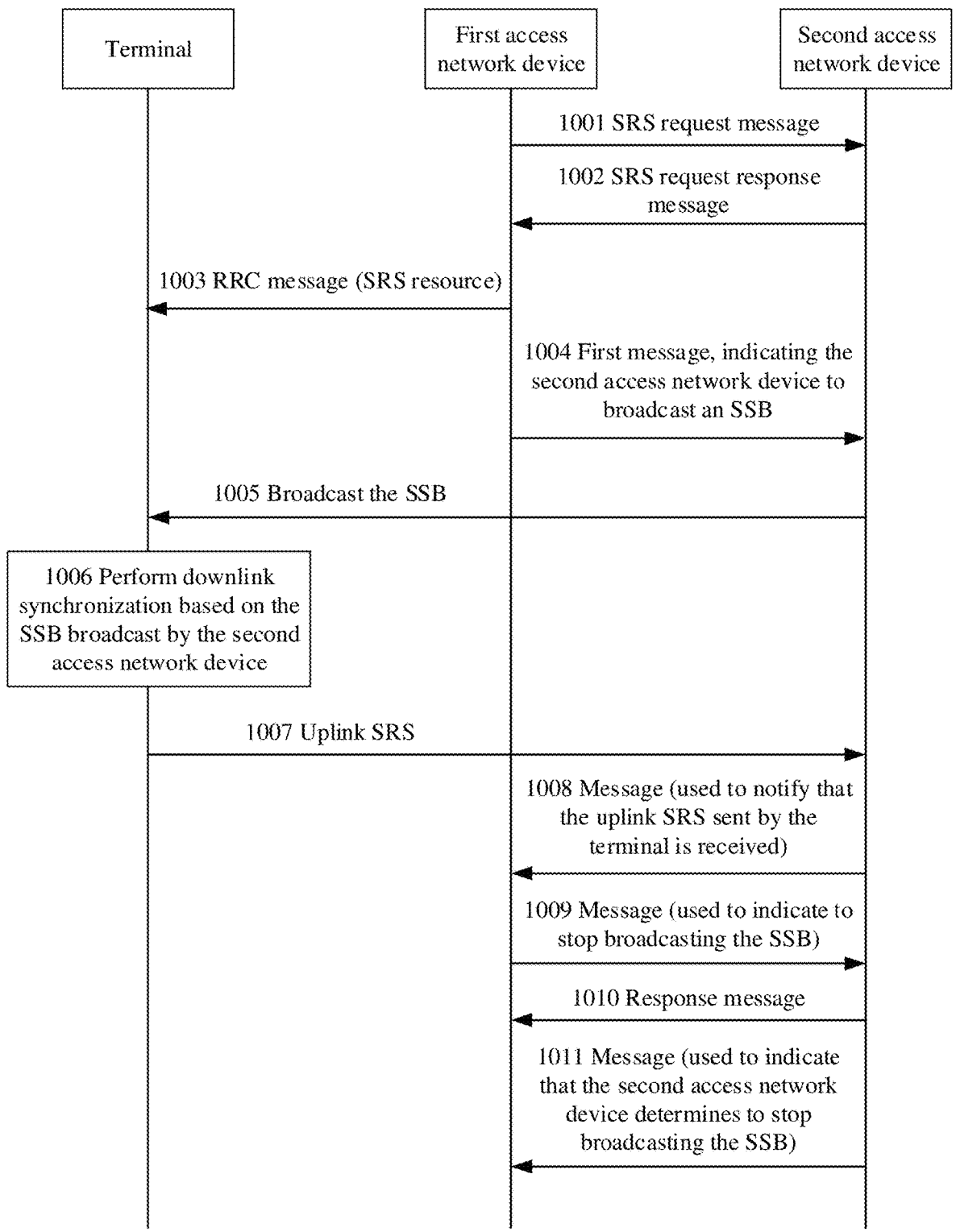
FIG. 10 is a fourth schematic flowchart of an SBB broadcast method according to at least one embodiment.

Based on the descriptions of the foregoing embodiment, FIG. 10 shows another SBB broadcast method according to at least one embodiment. As shown in FIG. 10, the method includes the following steps. This embodiment involves a dual-connectivity architecture or a multi-connectivity architecture, where the first access network device is a master access network device, and the second access network device is an access network device that is to serve the terminal. Alternatively, this embodiment is applied to a handover scenario, where the first access network device is a source access network device, and the second access network device is a target access network device.

S1001: The first access network device sends an SRS request message to the second access network device, and the second access network device receives the SRS request message from the first access network device.

The SRS request message is used to request the second access network device to allocate an SRS resource to one or more terminals.

Optionally, the SRS request message further includes an identifier of the terminal, used to indicate to allocate the SRS resource to the terminal corresponding to the identifier. In response to the SRS request message not carrying the identifier of the terminal, the SRS request message is used to request that the SRS resource allocated by the second access network device is shared by a plurality of terminals.

In at least one embodiment, in response to no terminal initially accessing the second network device or no terminal performing downlink synchronization with the second network device, the second access network device disables SBB broadcasting. In this way, energy consumption of the second access network device is reduced.

S1002: The second access network device sends an SRS request response message to the first access network device, and the first access network device receives the SRS request response message from the second access network device.

The SRS request response message includes the SRS resource allocated by the second access network device to the one or more terminals.

S1001 and S1002 are implemented by using an Xn/X2 interface setup process. For example, the SRS request message is an Xn/X2 interface setup request message, and the SRS request response message is an Xn/X2 interface setup request response message.

S1003: The first access network device sends an RRC message to the terminal, and the terminal receives the RRC message sent by the first access network device.

For example, the RRC message is an RRC reconfiguration message.

The RRC message includes the SRS resource allocated by the second access network device, and the SRS resource is used by the terminal to send an SRS.

S1004: The first access network device sends a first message to the second access network device. The second access network device receives the first message from the first access network device. The first message indicates an SSB for the second access network device to broadcast. For details of this step, refer to S401.

A sequence of performing S1004 and S1003 is not limited, and S1004 and S1003 are performed simultaneously, or are performed interchangeably.

Optionally, a function of the SRS request message in S1001 has a function of the first message, to be specific, the SRS request message indicates an SSB for the second access network device to broadcast. In this case, S1004 is omitted.

S1005: The second access network device broadcasts the SBB. The terminal receives the SBB broadcast by the second access network device.

S1006: The terminal performs downlink synchronization based on common control information broadcast by the second access network device.

S1007: The terminal sends an uplink SRS to the second access network device, and the second access network device receives the uplink SRS from the terminal.

After S1007, S1008 to S1010 are further performed; or S1011 is further performed after S1007, so that the second access network device stops broadcasting the SBB. S1008 to S1010 are performed or S1011 is performed, that is, S1008 to S1010 are performed, and S1011 is not performed; or S1011 is performed, and S1008 to S1010 are not performed.

S1008: The second access network device sends a message to the first access network device, and the first access network device receives the message from the second access network device.

The message is an SRS notification message or a message of another name. The message is used to notify the first access network device that the second access network device has received the uplink SRS sent by the terminal. Optionally, the message includes the identifier of the terminal and/or a configuration of the SRS. The first access network device determines, by using identifiers of terminals, terminals whose uplink SRSs are received by the second access network device, so that the first access network device further determines whether to indicate the second access network device to stop broadcasting a downlink SBB.

This step is used as a possible implementation of S404 in the embodiment in FIG. 4.

S1009: The first access network device sends a message to the second access network device, and the second access network device receives the message from the first access network device. The message indicates an SSB for the second access network device to stop broadcasting.

This step is used as a possible implementation of S403 in the embodiment in FIG. 4.

S1010: The second access network device sends a response message for the message in S1009 to the first access network device, and the first access network device receives the response message sent by the second access network device.

The response message is used to notify the first access network device that the second access network device has stopped broadcasting the downlink SBB.

This step is optional, and is not performed in at least one embodiment.

S1011: The second access network device sends a message to the first access network device, where the message indicates to the second access network device to determine to stop broadcasting the downlink SBB. The first access network device receives the message sent by the second access network device.

After detecting the uplink SRS sent by the terminal, the second access network device determines to stop broadcasting the downlink SBB.

This step is used as a possible implementation of S406 in the embodiment in FIG. 4.

FIG. 10 shows an embodiment as follows: The first access network device and the second access network device are two devices in a dual-connectivity or multi-connectivity architecture, where the first access network device is a master access network device, and the second access network device is a secondary access network device. In response to determining that the second access network device performs resource allocation for the terminal, the first access network device indicates the second access network device to start to broadcast the SBB. A function of indicating to start to broadcast the SBB is implemented by using S1001 or S1004. In at least one embodiment, the first access network device is a source access network device, and the second access network device is a target access network device. After S1007, the second access network device determines, based on the received uplink SRS of the terminal, whether the terminal falls within a service range of the second access network device. If yes, the second access network device determines that the terminal is handed over from the first access network device to the second access network device. The message sent by the second access network device to the first access network device in S1008 indicates to the first access network device to perform handover, to be specific, hand over the terminal from the first access network device to the second access network device.

Figure 11:
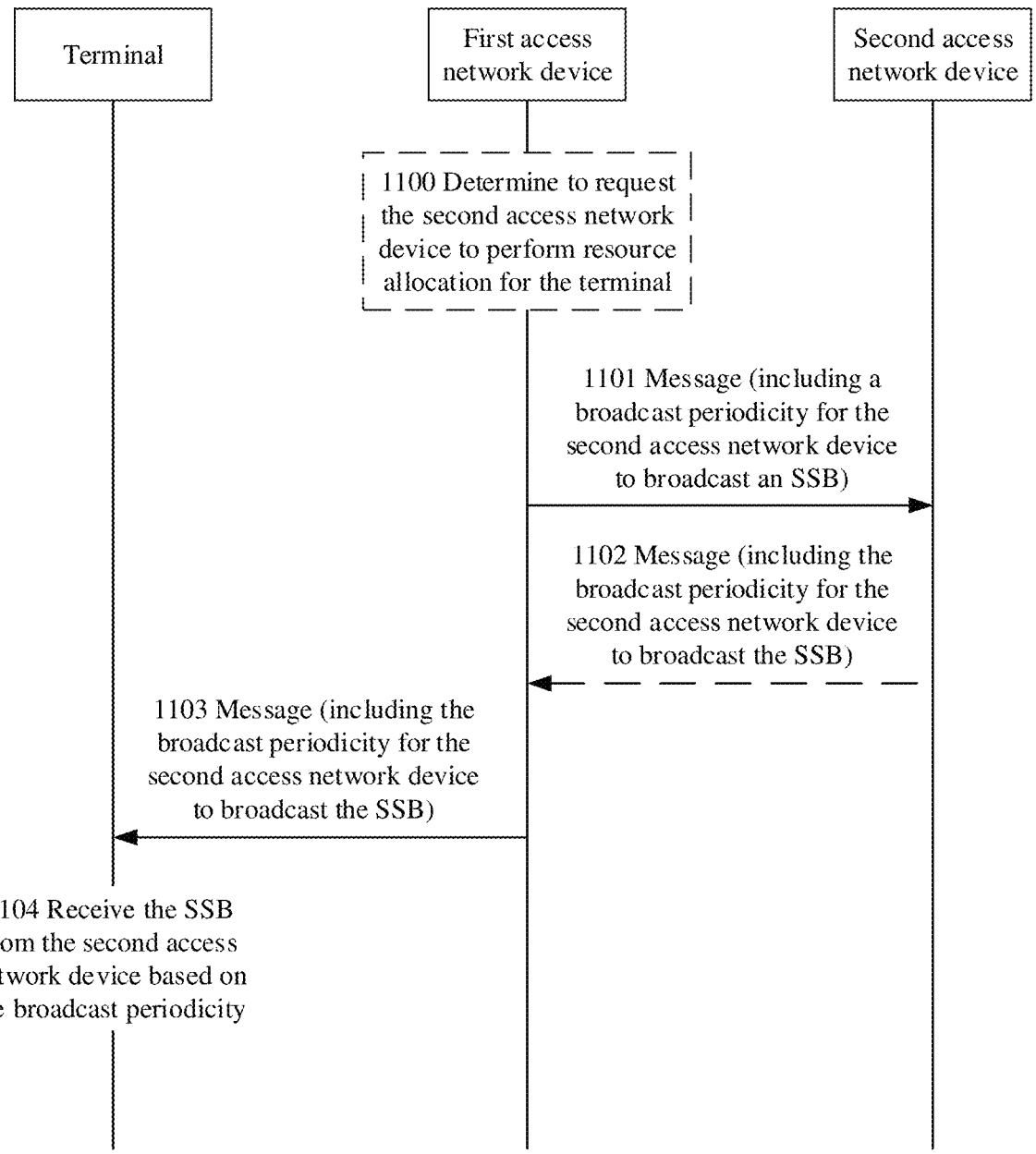
FIG. 11 is a fifth schematic flowchart of an SBB broadcast method according to at least one embodiment.

FIG. 11 shows another SBB broadcast method according to at least one embodiment. The method includes the following steps.

S1101: A first access network device sends a message to a second access network device, where the message carries a broadcast periodicity for the second access network device to broadcast an SBB; and the second access network device receives the message sent by the first access network device.

Certainly, the broadcast periodicity for the second access network device to broadcast the SBB is alternatively determined by the second access network device. In this case, the method does not include step S1101, but includes step S1102.

Optionally, before S1101, the method further includes step S1100. For step S1100, refer to the descriptions of step S400. Details are not described again.

S1102: The second access network device determines the broadcast periodicity for broadcasting the SBB, and sends a message to the first access network device, where the message carries the broadcast periodicity determined by the second access network device. The first access network device receives the message sent by the second access network device.

For example, the messages in S1101 and S1102 are explained as follows. The message indicates a broadcast periodicity for one or more cells served by the second access network device to broadcast one or more SBBs. For example, the message carries one or more identifiers of the one or more cells, and indicates the broadcast periodicity for the one or more cells to broadcast the one or more SBBs. A name of the message is not limited. For example, the message is a RAN configuration update message.

Either S1101 or S1102 are selected for execution. S1103 is performed after S1101 or S1102.

S1103: The first access network device sends a message to a terminal, and the terminal receives the message sent by the first access network device, where the message carries information about the broadcast periodicity for the second access network device to broadcast the SBB.

S1104: The terminal receives the SBB from the second access network device based on the broadcast periodicity.

For example, the first access network device sends an RRC reconfiguration message to the terminal, where the RRC reconfiguration message carries the broadcast periodicity. The terminal receives the RRC reconfiguration message from the first access network device, receives the SBB from the second access network device based on the broadcast periodicity carried in the RRC reconfiguration message, and sends an RRC reconfiguration complete message to the first access network device. Based on S1102, the information that is about the broadcast periodicity and that is sent by the first access network device to the terminal is sent by the second access network device to the first access network device, and then sent (for example, transparently transmitted) by the first access network device to the terminal. In addition to notifying, by using the RRC message, the terminal of the SBB broadcast periodicity of the second access network device, the first access network device further notifies, by using a broadcast message, the terminal of the SBB broadcast periodicity of the second access network device. For example, the first access network device notifies, by using a SIB 10, the terminal of the SBB broadcast periodicity of the second access network device.

The broadcast periodicity described in the foregoing steps is at a cell granularity. For example, the broadcast periodicity is set for one or more cells served by the second access network device. In response to sending the broadcast periodicity to the second access network device, the first access network device sends the broadcast periodicity with a cell identifier, to indicate the broadcast periodicity corresponding to a cell. Alternatively, in response to sending the broadcast periodicity to the first access network device, the second access network device sends the broadcast periodicity with a cell identifier, to indicate the broadcast periodicity corresponding to a cell.

Before step S1101 or S1102, in response to the second access network device broadcasting no SBB, after S1101 or S1102, the second access network device broadcasts the SBB based on the broadcast periodicity indicated by the message in step S1101 or S1102. In response to the second access network device broadcasting the SBB based on a first broadcast periodicity before step S1101 or S1102, after step S1101 or S1102, the second access network device broadcasts the SBB based on the broadcast periodicity indicated by the message in step S1101 or S1102. For ease of description, the broadcast periodicity in S1101 or S1102 is referred to as a second broadcast periodicity.

Optionally, the second broadcast periodicity in S1101 and S1102 is shorter than the first broadcast periodicity.

For example, the first broadcast periodicity is 160 ms. Broadcasting the SBB in the longer broadcast periodicity of 160 ms reduces energy consumption of the second access network device. In response to the first access network device determines to request the second access network device to perform resource allocation for the terminal, the first access network device performs steps S1101 and S1103. In step S1101, the second access network device is notified that the broadcast periodicity is adjusted to the second broadcast periodicity. The second broadcast periodicity is a periodicity shorter than 160 ms, for example, 20 ms. In step S1103, the terminal obtains the second broadcast periodicity.

The second access network device shortens the broadcast periodicity, so that the terminal accesses the second access network device more quickly. After the terminal accesses the second access network device, the first access network device indicates the second access network device to prolong the broadcast periodicity and correspondingly notify the terminal of the prolonged broadcast periodicity. For example, the broadcast periodicity is adjusted back to the first broadcast periodicity, so that the energy consumption of the second access network device is reduced. The first access network device indicates the broadcast periodicity to the second access network device, or the second access network device indicates the broadcast periodicity to the first access network device, and the first access network device sends the broadcast periodicity to the terminal, so that the terminal obtains the broadcast periodicity of the second access network device, and receives the SBB based on the broadcast periodicity of the second access network device. The energy consumption is further reduced by prolonging the periodicity for the second access network device to broadcast the SBB. A speed at which the terminal accesses the second access network device is increased by shortening the periodicity for the second access network device to broadcast the SBB. The broadcast periodicity is sent to the terminal, so that the terminal is prevented from selecting another network for access because no SBB is found in response to searching for the SBB based on a periodicity shorter than the broadcast periodicity of the second access network device. This helps the terminal normally access the second access network device.

The messages (for example, the first message, the second message, the third message, the fourth message, the fifth message, or the sixth message) described in embodiments reuse messages in an existing protocol. Specifically, names of the messages that reuse the messages in the existing protocol are message names in the foregoing examples of the messages, or are other message names. A message is alternatively a newly defined message, and a name of the newly defined message is not limited. For example, the first message is an SBB trigger request message, the second message is an SBB broadcast stop message, and the third message is an access report (access report).

Embodiments described herein are provided to better understand and describe the method. Persons skilled in the art obtain examples of some evolution forms according to the SBB broadcast method.

In the foregoing embodiments described herein, the methods are described from perspectives of the first access network device, the second access network device, the third access network device, the terminal, and interaction between the devices. To implement functions in the foregoing methods provided in embodiments described herein, the first terminal device, the second terminal device, the third access network device, and the terminal device includes a hardware structure and/or a software module, and implement the foregoing functions in a form of the hardware structure, the software module, or a combination of the hardware structure and the software module. Whether one of the functions is implemented by using the hardware structure, the software module, or the combination of the hardware structure and the software module depends on a particular use and a design constraint condition of the technical solutions.

Figure 12:
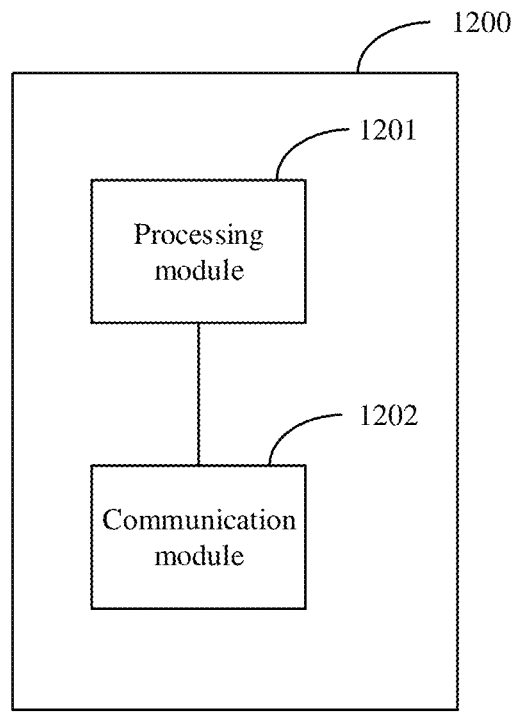
FIG. 12 is a first schematic diagram of a structure of a communication apparatus according to at least one embodiment.

As shown in FIG. 12, an embodiment further provides an apparatus 1200. The apparatus 1200 is a terminal device or an access network device. The access network device includes a first access network device, a second access network device, or a third access network device; or is an apparatus in the terminal device or the access network device; or an apparatus that is used in matching with the terminal device or the access network device. In at least one embodiment, the apparatus 1200 includes modules that one-to-one correspond to the methods/operations/steps/actions performed by the terminal device or the access network device in the foregoing method embodiments. The module is implemented by a hardware circuit, software, or a combination of a hardware circuit and software. In at least one embodiment, the apparatus includes a processing module 1201 and a communication module 1202. The processing module 1201 is configured to invoke the communication module 1202 to perform a receiving function and/or a sending function.

In response to the apparatus being configured to perform the method performed by the first access network device, the processing module 1201 is configured to determine to request a second access network device to perform resource allocation for the terminal; and the communication module 1202 is configured to send a first message to the second access network device, where the first message indicates an SSB for the second access network device to broadcast.

Optionally, the processing module 1201 and the communication module 1202 is further configured to perform other steps performed by the first access network device. Details are not described herein again. For example, the processing module 1201 invokes the communication module 1202 to perform the sending and receiving operations performed by the first access network device in the embodiments in FIG. 4 to FIG. 11. The processing module 1201 is further configured to perform operations other than the sending and receiving operations of the first access network device in the embodiments in FIG. 4 to FIG. 11.

In response to the apparatus being configured to perform the method performed by the second access network device, the communication module 1202 is configured to receive a first message from a first access network device, where the first message indicates an SSB for the second access network device to broadcast; and the processing module 1201 is configured to invoke, based on the first message, the communication module 1202 to broadcast the SBB.

Optionally, the processing module 1201 and the communication module 1202 are further configured to perform other steps performed by the second access network device. Details are not described herein again. For example, the processing module 1201 invokes the communication module 1202 to perform the sending and receiving operations performed by the second access network device in the embodiments in FIG. 4, FIG. 5, and FIG. 7 to FIG. 11. The processing module 1201 is further configured to perform operations other than the sending and receiving operations of the second access network device in the embodiments in FIG. 4, FIG. 5, and FIG. 7 to FIG. 11.

In response to performing the method performed by the terminal, the communication module 1202 is configured to: receive, from a first access network device, information about a broadcast periodicity, where the broadcast periodicity is a periodicity for a second access network device to broadcast an SBB; and receive the SBB from the second access network device based on the broadcast periodicity.

The processing module 1201 and the communication module 1202 are further configured to perform another corresponding step or operation performed by the terminal in the foregoing method embodiments. Details are not described herein again. For example, the processing module 1201 invokes the communication module 1202 to perform the sending and receiving operations performed by the terminal in the embodiments in FIG. 5 to FIG. 11. The processing module 1201 is further configured to perform operations other than the sending and receiving operations of the terminal in the embodiments in FIG. 5 to FIG. 11.

Module division in this embodiment is an example and is merely logical function division, and other division during actual implementation. In addition, functional modules in embodiments are integrated into one processor or exist alone physically, or two or more modules are integrated into one module. The integrated module is implemented in a form of hardware, or is implemented in a form of a software functional module.

Figure 13:
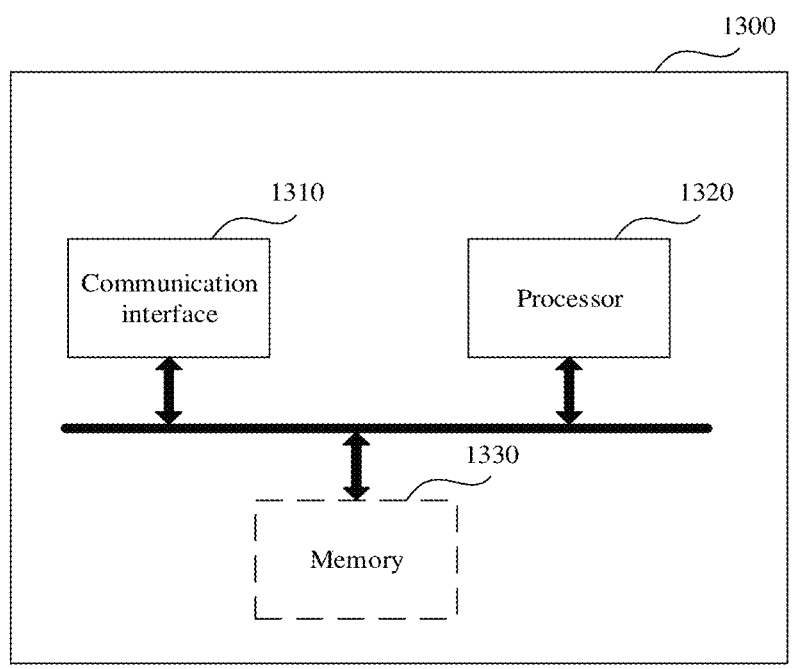
FIG. 13 is a second schematic diagram of a structure of a communication apparatus according to at least one embodiment.

FIG. 13 shows an apparatus 1300 according to at least one embodiment. The apparatus 1300 is configured to implement a function of the terminal device or the access network device in the foregoing methods. The access network device includes a first access network device, a second access network device, and a third access network device. In response to the function of the access network device being implemented, the apparatus is an access network device, an apparatus in the access network device, or an apparatus that is used in matching with the access network device. In response to the function of the terminal device being implemented, the apparatus is a terminal device, an apparatus in the terminal device, or an apparatus that is used in matching with the terminal device. The apparatus is a chip system. In embodiments, the chip system includes a chip, or includes a chip and another discrete component. The apparatus 1300 includes at least one processor 1320, configured to implement the function of the terminal device or the access network device in the methods provided in at least one embodiment. The apparatus 1300 further includes a communication interface 1310. In this embodiment, the communication interface is a transceiver, a circuit, a bus, a module, or a communication interface of another type, and is configured to communicate with another device by using a transmission medium. For example, the communication interface 1310 is used by an apparatus in the apparatus 1300 to communicate with another device. For example, in response to the apparatus 1300 being the first access network device, the another device is the second access network device or the terminal device. In response to the apparatus 1300 is the second access network device, the another device is the first access network device, the third access network device, or the terminal device. In response to the apparatus 1300 being the third access network device, the another device is the second access network device, the first access network device, or the terminal. In response to the apparatus 1300 being the terminal, the another device is the first access network device, the second access network device, or the third access network device. The processor 1320 sends and receives data through the communication interface 1310, and is configured to implement the methods in the foregoing method embodiments.

For example, in response to a function of the first access network device being implemented, the processor 1320 is configured to determine to request the second access network device to perform resource allocation for the terminal; and the communication interface 1310 is configured to send a first message to the second access network device, where the first message indicates an SSB for the second access network device to broadcast. The processor 1320 and the communication interface 1310 are further configured to perform other steps performed by the first access network device. Details are not described herein again. For example, the processor 1320 invokes the communication interface 1310 to perform the sending and receiving operations performed by the first access network device in the embodiments in FIG. 4 to FIG. 11. The processor 1320 is further configured to perform operations other than the sending and receiving operations of the first access network device in the embodiments in FIG. 4 to FIG. 11.

In response to a function of the second access network device being implemented, the communication interface 1310 is configured to receive the first message from the first access network device, where the first message indicates an SSB for the second access network device to broadcast; and the processor 1320 is configured to invoke, based on the first message, the communication interface 1310 to broadcast the SBB. The processor 1320 and the communication interface 1310 are further configured to perform other steps performed by the second access network device. Details are not described herein again. For example, the processor 1320 invokes the communication interface 1310 to perform the sending and receiving operations performed by the second access network device in the embodiments in FIG. 4, FIG. 5, and FIG. 7 to FIG. 11. The processor 1320 is further configured to perform operations other than the sending and receiving operations of the second access network device in the embodiments in FIG. 4, FIG. 5, and FIG. 7 to FIG. 11.

In response to a function of the third access network device being implemented, the processor 1320 and the communication interface 1310 are configured to perform the steps performed by the third access network device in the foregoing method embodiment. Details are not described herein again. For example, the processor 1320 invokes the communication interface 1310 to perform the sending and receiving operations performed by the third access network device in the embodiment in FIG. 7 or FIG. 8. The processor 1320 is further configured to perform operations other than the sending and receiving operations of the third access network device in the embodiment in FIG. 7 or FIG. 8.

In response to a function of the terminal being implemented, the processor 1320 is configured to: receive, from the first access network device through the communication interface 1310, information about a broadcast periodicity, where the broadcast periodicity is a periodicity for the second access network device to broadcast an SBB; and receive the SBB from the second access network device based on the broadcast periodicity. The processor 1320 and the communication interface 1310 are further configured to perform another corresponding step or operation performed by the terminal in the foregoing method embodiments. Details are not described herein again. In response to the method performed by the terminal being performed, the processor 1320 and the communication interface 1310 are further configured to perform other steps performed by the foregoing terminal. Details are not described herein again. For example, the processor 1320 invokes the communication interface 1310 to perform the sending and receiving operations performed by the terminal in the embodiments in FIG. 5 to FIG. 11. The processor 1320 is further configured to perform operations other than the sending and receiving operations of the terminal in the embodiments in FIG. 5 to FIG. 11.

The apparatus 1300 further includes at least one memory 1330, configured to store program instructions and/or data. The memory 1330 is coupled to the processor 1320. Couplings in this embodiment are indirect couplings or communication connections between apparatuses, units, or modules, are implemented in electrical, mechanical, or other forms, and are used for information exchange between the apparatuses, the units, or the modules. The processor 1320 operates in collaboration with the memory 1330. The processor 1320 executes the program instructions stored in the memory 1330. At least one of the at least one memory is included in the processor.

In this embodiment, a specific connection medium among the communication interface 1310, the processor 1320, and the memory 1330 is not limited. In this embodiment, in FIG. 13, the memory 1330, the communication interface 1320, and the communication interface 1310 are connected through a bus 1340. The bus is represented by a bold line in FIG. 13. A connection manner between other components is merely an example for description, and is not limited thereto. The bus is classified into an address bus, a data bus, a control bus, and the like. For ease of indication, the bus is indicated by using a bold line in FIG. 13. However, it does not indicate that there is one bus or one type of bus.

In response to the apparatus 1200 and the apparatus 1300 being chips or chip systems, the communication module 1202 and the communication interface 1310 output or receive a baseband signal. In response to the apparatus 1200 and the apparatus 1300 being devices, the communication module 1202 and the communication interface 1310 output or receive a radio frequency signal. In this embodiment, the processor is a general-purpose processor, a digital signal processor, an application-specific integrated circuit, a field programmable gate array or another programmable logic device, a discrete gate or transistor logic device, or a discrete hardware component, and implements or performs the methods, steps, and logical block diagrams disclosed in at least one embodiment. The general-purpose processor is a microprocessor, or is any processor or the like programmable to perform at least one embodiment described herein. The steps of the methods disclosed with reference to at least one embodiment are directly performed and completed by a hardware processor, or are performed and completed by using a combination of hardware and a software module in the processor.

In at least one embodiment, the memory is a non-volatile memory, for example, a hard disk drive (hard disk drive, HDD) or a solid-state drive (solid-state drive, SSD); or is a volatile memory (volatile memory), for example, a random access memory (random access memory, RAM). The memory is any other medium that is used to carry or store program code in a form of an instruction or a data structure and that is accessed by a computer, but is not limited thereto. The memory in this embodiment is alternatively a circuit or any other apparatus that implements a storage function, and is configured to store program instructions and/or data.

An embodiment provides a computer-readable storage medium that stores computer-readable instructions. In response to the computer-readable instructions being run on a communication apparatus, the communication apparatus is enabled to perform the foregoing method embodiments.

An embodiment provides a computer program product including instructions. In response to the computer program product running on a communication apparatus, the communication apparatus is enabled to perform the foregoing method embodiments.

Persons skilled in the art understand that embodiments are provided as a method, a system, or a computer program product. Therefore, this embodiment uses a form of hardware only embodiments, software only embodiments, or embodiments with a combination of software and hardware. Moreover, this embodiment uses a form of a computer program product that is implemented on one or more computer-usable storage media (including but not limited to a disk memory, a CD-ROM, an optical memory, and the like) that include computer usable program code.

Embodiments described herein are described with reference to the flowcharts and/or block diagrams of the method, the device (system), and the computer program product according to embodiments. Computer program instructions are used to implement one or more processes and/or one or more blocks in the flowcharts and/or the block diagrams and a combination of a process and/or a block in the flowcharts and/or the block diagrams. These computer program instructions are provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions are stored in a computer-readable memory and instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions are loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although embodiments have been described, persons skilled in the art are able to changes and modifications to these embodiments once they learn the basic inventive concept. Therefore, the following claims are intended to be construed as to cover embodiments described herein and changes and modifications falling within the scope of the described embodiments.

It is clear that persons skilled in the art are able to make various modifications and variations without departing from the spirit and scope of the embodiments. At least one embodiment described herein is intended to cover these modifications and variations to embodiments provided that they fall within the scope of the claims and their equivalent technologies.

What is claimed is:

1. A synchronization signal/physical broadcast channel block (SSB) broadcast method, comprising:
   determining, by a first access network device, to request a second access network device to perform resource allocation for a terminal; and
   sending, by the first access network device, a first message to the second access network device, wherein the first message indicates the second access network device to start to broadcast an SSB only in response to receiving the first message, and in accordance with a broadcast periodicity included in the first message indicating a periodicity for the second access network device to broadcast the SSB.

2. The method according to claim 1, wherein the method further comprises:

sending, by the first access network device, the broadcast periodicity to the terminal.

3. The method according to claim 1, wherein the method further comprises:
sending, by the first access network device, a second message to the second access network device, wherein the second message indicates to the second access network device to stop broadcasting the SSB.

4. The method according to claim 3, wherein before the sending, by the first access network device, the second message to the second access network device, the method further comprises:
receiving, by the first access network device, a third message from the second access network device, wherein the third message indicates a state in which the terminal accesses the second access network device.

5. The method according to claim 1, wherein before the determining, by the first access network device, to request the second access network device to perform resource allocation for the terminal, the method further comprises:
sending, by the first access network device, a fourth message to the terminal, wherein the fourth message includes a first threshold, or the fourth message indicates a reporting condition of the terminal, and the reporting condition includes that the terminal triggers reporting in response to a measured strength of a downlink signal of the first access network device being greater than or equal to the first threshold; and
receiving, by the first access network device, a fifth message from the terminal, wherein the fifth message includes the strength that is of the downlink signal of the first access network device and that is measured by the terminal, or the fifth message indicates the strength is of the downlink signal of the first access network device and that the strength is greater than or equal to the first threshold.

6. The method according to claim 1, wherein the method further comprises:
sending, by the first access network device, a sixth message to the terminal, wherein the sixth message includes a second threshold, or the sixth message indicates a reporting condition of the terminal, wherein the reporting condition includes that the terminal triggers reporting in response to a measured strength of a downlink signal of the second access network device being greater than or equal to the second threshold; and
receiving, by the first access network device, a seventh message from the terminal, wherein the seventh message includes the strength that is of the downlink signal of the second access network device and that is measured by the terminal, or a fifth message indicates the strength is of the downlink signal of the second access network device and that the strength is greater than or equal to the second threshold.

7. The method according to claim 1 wherein before the determining, by the first access network device, to request the second access network device to perform resource allocation for the terminal, the method further comprises:
receiving, by the first network device, an eighth message from a third network device, wherein the eighth message indicates that a secondary access network device of the terminal is to be handed over from the third network device to the second network device, or indicates that the second network device is to be added as the secondary access network device of the terminal.

8. The method according to claim 1, wherein the second access network device has a default periodicity for broadcasting the SSB and the broadcast periodicity is longer than the default periodicity.

9. A synchronization signal/physical broadcast channel block (SSB) broadcast method, comprising:
receiving, by a terminal from a first access network device, a first message including a broadcast periodicity, wherein the broadcast periodicity is a periodicity for a second access network device to start to broadcast an SSB, wherein the second access network device starts to broadcast the SSB only in response to receiving a second message received from the first network device message and in accordance with the broadcast periodicity, the second message indicates the second access network device to start to broadcast the SSB, and the second message comprises the broadcast periodicity; and
receiving, by the terminal, the SSB from the second access network device based on the broadcast periodicity.

10. The method according to claim 9, wherein the broadcast periodicity comprises a periodicity for one or more cells of the second access network device to broadcast one or more SSBs; and
the receiving, by the terminal, the SSB from the second access network device based on the broadcast periodicity includes: receiving, by the terminal, the one or more SSBs from the one or more cells of the second access network device based on the broadcast periodicity.

11. A communication apparatus, comprising: at least one processor, wherein the at least one processor is coupled to at least one memory storing programming instructions executable by the at least one processor to perform operations comprising:
determining to request a second access network device to perform resource allocation for a terminal; and
sending a first message to the second access network device, wherein the first message indicates the second access network device to start to broadcast a synchronization signal/physical broadcast channel block (SSB) only in response to receiving the first message, and in accordance with a broadcast periodicity included in the first message indicating a periodicity for the second access network device to broadcast the SSB.

12. The apparatus according to claim 11, wherein the operations further comprises:
sending the broadcast periodicity to the terminal.

13. The apparatus according to claim 11, wherein the operations further comprises:
sending a second message to the second access network device, wherein the second message indicates to the second access network device to stop broadcasting the SSB.

14. The apparatus according to claim 13, wherein the operations further comprises:
sending a fourth message to the terminal, wherein the fourth message includes a first threshold, or the fourth message indicates a reporting condition of the terminal, and the reporting condition includes that the terminal triggers reporting in response to a measured strength of a downlink signal of a first access network device being greater than or equal to the first threshold; and
receiving a fifth message from the terminal, wherein the fifth message includes the strength that is of the downlink signal of the first access network device and that is measured by the terminal, or the fifth message indicates the strength that is of the downlink signal of the first access network device and that the strength is greater than or equal to the first threshold.

15. The apparatus according to claim 13, wherein the operations further comprises:
before sending the second message to the second access network device, receiving a third message from the second access network device, wherein the third message indicates a state in which the terminal accesses the second access network device.

16. The apparatus according to claim 11, wherein the operations further comprises:
sending a sixth message to the terminal, wherein the sixth message includes a second threshold, or the sixth message indicates a reporting condition of the terminal, wherein the reporting condition includes that the terminal triggers reporting in response to a measured strength of a downlink signal of the second access network device being greater than or equal to the second threshold; and
receiving a seventh message from the terminal, wherein the seventh message includes the strength that is of the downlink signal of the second access network device and that is measured by the terminal, or a fifth message indicates that the strength that is of the downlink signal of the second access network device and that the strength is greater than or equal to the second threshold.

17. The apparatus according to claim 11, wherein the operations further comprises:
receiving an eighth message from a third network device, wherein the eighth message indicates that a secondary access network device of the terminal is to be handed over from the third network device to the second network device, or indicates that the second network device is to be added as the secondary access network device of the terminal.

18. The apparatus according to claim 11, wherein the second access network device has a default periodicity for broadcasting the SSB and the broadcast periodicity is longer than the default periodicity.

19. A communication apparatus, comprising: at least one processor, wherein the at least one processor is coupled to at least one memory storing programming instructions executable by the at least one processor to perform operations comprising:
receiving, from a first access network device, a first message including a broadcast periodicity, wherein the broadcast periodicity is a periodicity for a second access network device to broadcast a synchronization signal/broadcast signal block (SSB), wherein the second access network device starts to broadcast the SSB only in response to receiving a second message received from the first network device message and in accordance with the broadcast periodicity, the second message indicates the second access network device to start to broadcast the SSB, and the second message comprises the broadcast periodicity; and
receiving the SBB from the second access network device based on the broadcast periodicity.

20. The apparatus according to claim 19, wherein the broadcast periodicity includes a periodicity for one or more cells of the second access network device to broadcast one or more SSBs; and the operations further comprises:
receiving the one or more SSBs from the one or more cells of the second access network device based on the broadcast periodicity.

* * * * *